United States Patent
Zapata

(10) Patent No.: US 11,840,325 B2
(45) Date of Patent: Dec. 12, 2023

(54) DEVICE FOR PROPELLING A PASSENGER

(71) Applicant: ZIPAIR, Le Rove (FR)

(72) Inventor: Frankie Zapata, Le Rove (FR)

(73) Assignee: ZIPAIR, Chateauneuf-les-Martigues (FR)

( * ) Notice: Subject to any disclaimer, the term of this patent is extended or adjusted under 35 U.S.C. 154(b) by 0 days.

(21) Appl. No.: 17/450,096

(22) Filed: Oct. 6, 2021

(65) Prior Publication Data

US 2022/0024586 A1 Jan. 27, 2022

Related U.S. Application Data

(63) Continuation of application No. 16/092,092, filed as application No. PCT/FR2017/050829 on Apr. 6, 2017, now Pat. No. 11,453,479.

(51) Int. Cl.
| | |
|---|---|
| *B64C 15/12* | (2006.01) |
| *B64C 29/00* | (2006.01) |
| *B63B 34/15* | (2020.01) |
| *B64C 39/02* | (2023.01) |
| *B64D 37/06* | (2006.01) |

(52) U.S. Cl.
CPC ............. *B64C 15/12* (2013.01); *B63B 34/15* (2020.02); *B64C 29/0075* (2013.01); *B64C 39/026* (2013.01); *B64D 37/06* (2013.01)

(58) Field of Classification Search
CPC ..... B64C 15/12; B64C 29/00; B64C 29/0033; B64C 29/0075; B64C 39/026; B63B 34/15; B63B 34/21; B63B 34/22; B63B 34/23
See application file for complete search history.

(56) References Cited

U.S. PATENT DOCUMENTS

| | | | |
|---|---|---|---|
| 2,417,896 A | 3/1947 | Zimmerman | |
| 2,625,229 A | 1/1953 | Voorhees | |
| 2,943,816 A | 7/1960 | Hiller, Jr. | |
| 3,034,746 A | 5/1962 | De Temple | |
| 3,243,144 A | 3/1966 | Hulbert et al. | |
| 3,277,858 A | 10/1966 | Athey | |
| 3,381,917 A | 5/1968 | Moore et al. | |

(Continued)

FOREIGN PATENT DOCUMENTS

| | | |
|---|---|---|
| CN | 102105357 A | 6/2011 |
| CN | 105059072 A | 11/2015 |

(Continued)

OTHER PUBLICATIONS

International Search Report (PCT/ISA/210) dated Jul. 10, 2017, by the European Patent Office as the International Searching Authority for International Application No. PCT/FR2017/050829.

(Continued)

*Primary Examiner* — Joshua J Michener
*Assistant Examiner* — Arfan Y. Sinaki
(74) *Attorney, Agent, or Firm* — BUCHANAN INGERSOLL & ROONEY PC

(57) ABSTRACT

A propulsion device has a body including a platform and a thrust unit, the thrust unit including a first thermal thruster configured to eject a gaseous flow along an axis normal to the platform, the body of the propulsion device including support means of the thrust unit, wherein said thrust unit includes a first electrical secondary thruster configured to correct the attitude of the propulsion device.

7 Claims, 8 Drawing Sheets

(56) References Cited

U.S. PATENT DOCUMENTS

| | | | |
|---|---|---|---|
| 3,443,775 | A | 5/1969 | Williams |
| 3,506,221 | A | 4/1970 | Caillette et al. |
| 3,556,438 | A | 1/1971 | Meditz |
| 3,662,973 | A | 5/1972 | Collins |
| 4,447,024 | A | 5/1984 | Williams |
| 5,779,188 | A | 7/1998 | Frick |
| 6,179,247 | B1 | 1/2001 | Milde |
| 6,969,027 | B2 | 11/2005 | Ishiba |
| 7,258,301 | B2 | 8/2007 | Li |
| 8,336,805 | B1 | 12/2012 | Zapata |
| 9,352,665 | B2 | 5/2016 | Melvin et al. |
| 9,555,863 | B2 | 1/2017 | Robinson |
| 9,776,718 | B2 | 10/2017 | Homer |
| D810,617 | S | 2/2018 | Duru et al. |
| 10,112,713 | B2 | 10/2018 | Tyler et al. |
| D846,032 | S | 4/2019 | Frawley |
| 10,245,500 | B2 | 4/2019 | Chen |
| 10,464,671 | B2 * | 11/2019 | Duru ................... B64D 27/24 |
| 10,710,718 | B2 * | 7/2020 | Duru ................... B64D 27/24 |
| 2002/0113165 | A1 | 8/2002 | Moshier |
| 2003/0080242 | A1 | 5/2003 | Kawai |
| 2003/0197089 | A1 | 10/2003 | Klima |
| 2004/0061023 | A1 | 4/2004 | Lau |
| 2006/0049304 | A1 | 3/2006 | Sanders et al. |
| 2008/0014811 | A1 | 1/2008 | Zeyger |
| 2008/0142644 | A1 | 6/2008 | Oroark |
| 2010/0151752 | A1 | 6/2010 | Hattori et al. |
| 2013/0203306 | A1 | 8/2013 | Zapata |
| 2014/0263849 | A1 | 9/2014 | Li |
| 2014/0374542 | A1 | 12/2014 | Li et al. |
| 2015/0028161 | A1 | 1/2015 | Parks |
| 2015/0175031 | A1 | 6/2015 | Henderson et al. |
| 2015/0360755 | A1 | 12/2015 | Robinson |
| 2016/0291598 | A1 | 10/2016 | Youmans |
| 2019/0161188 | A1 | 5/2019 | Zapata |

FOREIGN PATENT DOCUMENTS

| | | |
|---|---|---|
| JP | 2008094277 A | 4/2008 |
| JP | 2011521833 A | 7/2011 |
| WO | 2013041787 A1 | 3/2013 |
| WO | 2014195660 A1 | 12/2014 |
| WO | 2015103700 A1 | 7/2015 |

OTHER PUBLICATIONS

Written Opinion (PCT/ISA/237) dated Jul. 10, 2017, by the European Patent Office as the International Searching Authority for International Application No. PCT/FR2017/050829.

Official Action issued in U.S. Appl. No. 16/092,092, dated Feb. 1, 2022 (21 pages).

* cited by examiner

[Fig. 1]
PRIOR ART
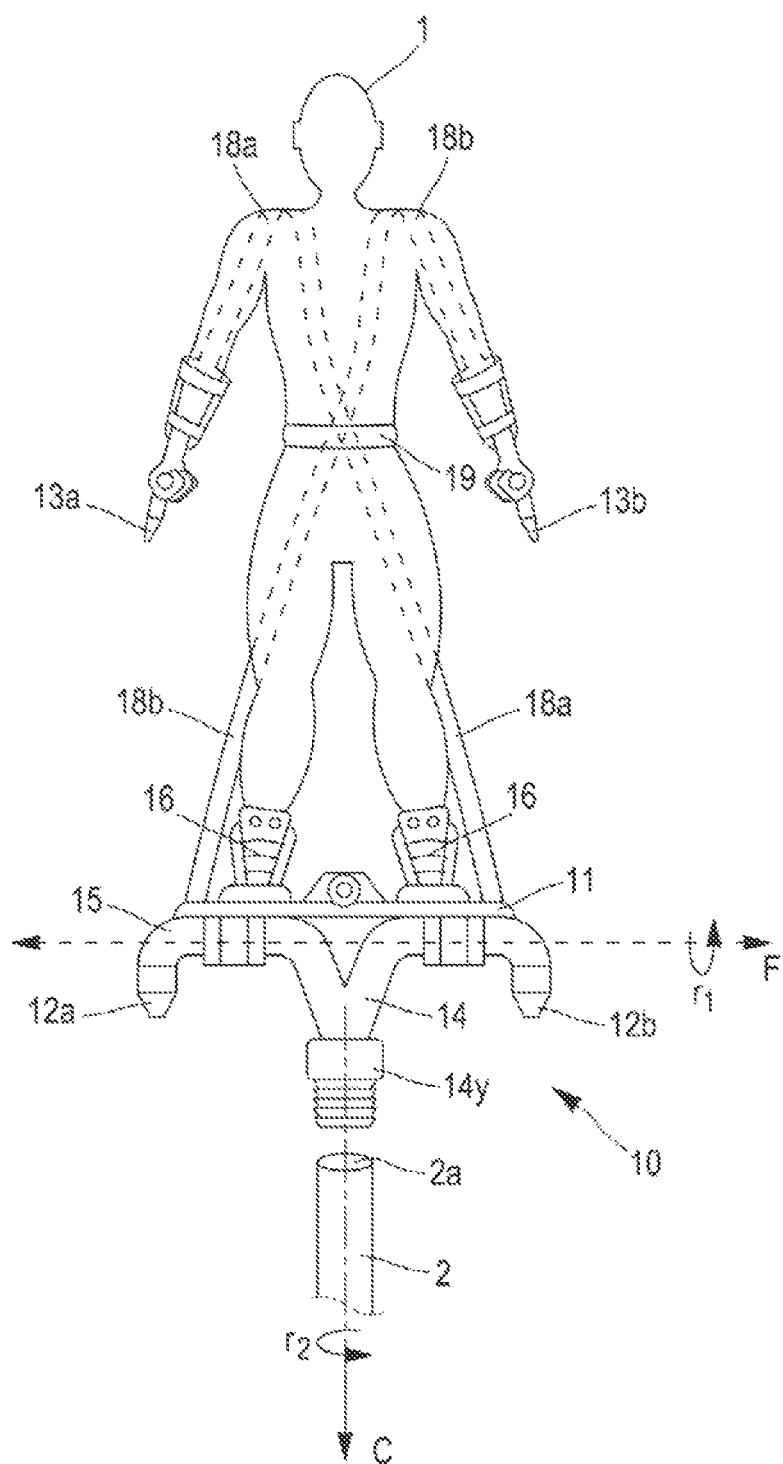

DEVICE FOR PROPELLING A PASSENGER

This application is a continuation of U.S. application Ser. No. 16/092,092 filed on Oct. 8, 2018, which is the U.S. National Stage of International Application No. PCT/FR2017/050829 filed on Apr. 6, 2017, and claims the benefit of French Application No. FR1653136 filed Apr. 8, 2016 and French Application No. FR1654171 filed May 10, 2016, the entire content of each of which is incorporated herein by reference.

The invention relates to a device for propelling a passenger so that the latter can move in the air with very great freedom of movement thanks to his agility and his physique.

The invention also envisages that the device is very simple to use and accessible to as many users as possible.

To move as freely as possible through space is a constant preoccupation for human beings; indeed, for some, it is a virtually unattainable dream. Numerous machines have been devised, from the most basic to the most sophisticated, in order to achieve this aim with more or less success.

Thus, in an attempt to move on the surface of the water or in a sometimes hostile environment, a propulsion device was devised in the sixties last century, as described in documents U.S. Pat. No. 3,243,144 or 3,381,917. Such a device comprises a body in the form of a harness or seat against which or in which a passenger can take up position. Such a body cooperates with a thrust unit, specifically in the form of a pair nozzles to eject a pressurized fluid and thus generate a sufficient thrust force to support the passenger in the air. In order to simplify the passenger's flight and reduce the physical effort thereof, the nozzles are clearly arranged above the center of gravity of the passenger/body assembly, more precisely level with the shoulders of said passenger. The thrust unit also comprises a station for the compression of a fluid supplied as a gas or inflammable liquid(s) and positioned on the passenger's back. This station is capable of sufficiently supplying the nozzles in order to cause the takeoff of the passenger, transformed in a manner of speaking into a human rocket. The short range and dangerous nature of these devices has meant that they have remained relatively private.

More recently, a device, as described in documents U.S. Pat. No. 7,258,301 or US 2008/0014811 A1, draws inspiration from this teaching while adapting it to reduce the dangerous nature thereof. The compression station is now remote. Furthermore, the pressurized fluid is water that is compressed by turbining, drawing inspiration in this aspect chiefly from experiments aimed at using compressed water in order to reduce the physical exertion of a scuba diver, as suggested in document U.S. Pat. No. 3,277,858. Documents U.S. Pat. No. 7,258,301 or US 2008/0014811 A1 thus propose an airborne propulsion device similar to its predecessor, adapted so that the pressurized water is routed through a remote compression station by means of a supply pipe such as a fire hose. The configuration of the nozzles, as well as the means enabling said nozzles to be oriented in order to determine the trajectory of the device, are intentionally retained in order to maintain a certain facility of operation for the passenger. The takeoff phases in particular, however, require an initial position of the passenger in a standing position, his feet on a solid support. The physical exertion of the passenger, reduced to its simplest expression in order to move, is to the detriment of the freedom and variety of the movements and displacements on the surface of the water or beneath the surface thereof. Furthermore, such a "device+station" system according to document U.S. Pat. No. 7,258,301 has a high cost associated with the design of the device comprising articulated nozzles and with the design of a dedicated compression station. The fact of being able to move in space has in itself an entertainment side. However, the configuration of the nozzles, located above the center of gravity of the device, gives the impression to the passenger of being suspended from the shoulders by a virtual crane hook and thus deprives him of numerous sensations brought on by drops and improvised or acrobatic stylistic expressions. Moreover, the variety of directions and movements is limited. It is not easy, for example, to move "crablike" with a known device, or to pass instantaneously from a straight trajectory on the surface of the water to a diving phase followed by multiple movements beneath the surface of the water.

In order largely to overcome these drawbacks, a particularly effective device, known as a "Flyboard," has been developed. It is described specifically in document U.S. Pat. No. 8,336,805 and has met with worldwide success. FIG. 1 thus shows an embodiment of such a propulsion device 10. This device 10 comprises a main body in the form of a substantially flat platform 11 on which a passenger 1 can take up position. The propulsion device, described with reference to FIG. 1, comprises a thrust unit cooperating with the platform 11. Such a thrust unit consists in a pair of main nozzles 12a and 12b fixed against the lower face of the platform 11. According to FIG. 1, the thrust unit of such a device can also comprise two secondary nozzles 13a and 13b to facilitate its handling. The latter are free and designed to be possibly and respectively held by a passenger 1 at the forearms or in the hands. In order to deliver a sufficient thrust force and enable a flight then a movement, the device 10 also comprises means to collect and distribute a pressurized fluid, water for example, to the main and secondary nozzles. Such a fluid is preferably routed by means of a flexible supply pipe 2 from a remote compression station, not shown in FIG. 1. Such a supply pipe can be made from a fire hose or any other materials having the necessary resistance to the pressure exerted by the pressurized fluid. A collector 14y can thus have a base 14c to which is connected an end-piece 2a of a supply pipe 2, for example by means of a groove adapted to receive said pipe 2. According to FIG. 1, the collector 14y can have a shape similar to a "Y" in order to collect from the base 14c and distribute via the arms the pressurized fluid to the main nozzles 12a and 12b respectively. The collector 14y is connected to the main nozzles or by means of a possible elbow 15, in order to orient the main nozzles along an axis substantially perpendicular to the lower face of the platform 11. The arms are connected to said main nozzles, via said elbow 15, by means of a pivoting connection at the arms. Such an arrangement enables a free rotation about an axis F substantially parallel to the arms of the collector 14y. Thus, said collector can describe an almost free rotation r1 about said axis F, taking into account the end stop that the lower face of platform 11 represents in the event of an excessive inclination of the latter. Furthermore, such a pivoting connection allows the user to "take off" easily from the surface of the water and gives him a great capacity for orientation and movement. A relative rotation r1 of the collector about the axis F facing the plane of the lower face of the platform 11, a consecutive rotation of the connection of the collector with the supply pipe 2, does not cause the rotation of the platform 11. The end-piece 2a of the supply pipe 2 can advantageously cooperate with the collector 14y at its base 14c by means of a pivoting connection to allow a free rotation r2 about an axis C substantially parallel to the pipe 2. The device can thus pivot freely about said axis C without creating loops or excessive stresses on the supply pipe 2.

In order to distribute the pressurized fluid to the secondary nozzles 13a and 13b, by way of example and as illustrated in FIG. 1, secondary tubes 18a and 18b—in the advantageous form of flexible pipes—can be provided to deliver from the collector 14y said pressurized fluid to the secondary nozzles. So as not to inconvenience the passenger 1, said secondary pipes can be guided along his back up to the shoulders by using retaining means 19, such as straps, harnesses, etc. A passenger can also use means to constrain the secondary nozzles at his forearms.

The platform 11 can have means for holding a passenger on the upper face of said platform 11. Thus, depending on the preferred position of a passenger on the platform, said retaining means can consist—as shown in FIG. 1—in a pair of shoes, also known as foot straps, or fixing boots 16 of a type similar to that which can be found, for example, in the practice of wakeboarding.

A propulsion device, such as the device 10 described in relation to FIG. 1, can be supplied by any fluid compression station provided that the latter is capable of delivering a fluid the pressure of which is sufficient to ensure the operation of the propulsion device. This station can be remote and dedicated to this use, at the risk of increasing the overall cost of a propulsion system comprising a propulsion device, a compression station and a supply pipe cooperating with said device and station to convey the pressurized fluid. Such a station can, as a variation, involve using a personal watercraft (hereinafter referred to as "PWC") adapted, as described in document WO2013/041787A1, to reduce the costs.

FIG. 1 preferably illustrates a system wherein the fluid used is pressurized water to move on the surface of the water. Although the propulsion device described in relation to FIG. 1 allows easy movement in and/or on the surface of the water and offers its user very great freedom of movement in order to perform a large number of figures, for certain people, it can have some drawbacks.

Like the previous device, the nozzles are supplied with compressed fluid, specifically water, conveyed to the device by means of a pipe via a collector, connecting said device to an advantageously remote fluid compression station. Such a solution works particularly well above, or even below, the surface of a stretch of water. Thus a compression station floating on said stretch of water, for example a personal watercraft adapted to cooperate with said pipe at the fluid outlet, collects the water, compresses it by turbining and delivers it via the pipe.

In order to move on the surface of the sea but also on the surface of the land, even without being hampered by a pipe conveying a compressed fluid, and thus rise to a very great height, in addition to the experimental solutions previously referred to in connection with documents U.S. Pat. No. 3,243,144 or 3,381,917 according to which a passenger cooperates with a harness provided with nozzles positioned substantially at shoulder height of said passenger and supplied by gaseous discharge delivered by combustion of an inflammable fuel contained in a tank on said passenger's back, other stakeholders have developed solutions that have remained confidential for some, because they were not appropriate for a potential market or required conditions of use that reserved said solution to a few privileged individuals. Thus, we can mention the device referred to in document U.S. Pat. No. 4,447,024 comprising a cradle onboard which a passenger can take up position. Said cradle contains within it a jet engine, substantially positioned along the passenger's legs. Such a solution is very bulky and not too movable. In fact, the cradle is very enveloping and the dimensions of the jet engine are massive. Such a technical teaching has never stood out as a solution appropriate for the majority and by its design remains inappropriate for leisure and acrobatics. By contrast, some have developed a flying wing that includes, like an aircraft, jet engines. Such a wing, the span of which is substantially that of the height of a human being, is positioned with the aid of a harness on the back of its driver. The latter is thus transformed into the fuselage of an aircraft. However, such a device is clearly appropriate for rectilinear movements and requires that the passenger, equipped with his wing, be released from an aircraft, for example a plane or a helicopter. In fact, it is not possible to take off from the ground and perform acrobatic figures near the ground. Furthermore, landing requires a parachute.

In short, so far no technical and realistic solution exists that offers mobility capabilities similar to those of a Flyboard, which has very small dimensions and offers its driver or passenger virtually unlimited acrobatic opportunities, movements on the surface of the land at high or low speeds and with extreme precision, all for a limited budget enabling widespread use to be envisaged.

The invention allows such an objective to be achieved, thus resolving the drawbacks of the known solutions. New perspectives regarding passenger movement and entertainment are thus available to everyone. Only the range perhaps remains to be increased depending on the application envisaged. The rise of technologies, particularly in terms of thrusters or batteries, will only confirm the appropriateness of a device for propelling a passenger according to the invention. Furthermore, the invention applies to different configurations of platform to convey one or more passengers and offers new methods of transport to all passengers, whatever his agility, whether seeking physical challenges or thrills or requiring comfort like a passenger or driver of a motorcycle or motor vehicle.

Among the numerous advantages offered by the invention, we can mention that:
  operating a device according to the invention is particularly intuitive; more particularly and by way of non-limiting example, the operation of such a device according to a first embodiment is very similar to that of a Flyboard that until now has set the standard of reference in terms of handling;
  the arrangement of a device according to the invention, whatever its configuration or its arrangement, keeps it operational, even when the thrust unit is partially faulty, thus maintaining the safety of the driver and any passengers;
  according to the embodiments of a device according to the invention and the accessories that can be associated therewith, it is possible easily to increase the range of said device and thus the duration and/or distance of the flight;
  the design of such a device enables takeoff and landing from or onto a particularly small area, on the order of a few square meters.

To this end, initially a passenger propulsion device is envisaged, said device comprising a body containing a platform arranged to accommodate said passenger and a thrust unit. So that such a device is particularly usable specifically for entertainment activities:
  said thrust unit comprises at least one thrust sub-unit comprising at least two thrusters;

the direction of gaseous flow ejection from each thruster can be oriented along an axis that is substantially normal to a longitudinal plane of the platform;

said body of the device comprises support means of the thrust unit cooperating with the platform and being arranged to support said thrust unit and minimize the distance between the direction of gaseous flow ejection from the ejection nozzle of each thruster and the orthogonal projection of said direction of gaseous flow ejection in a median plane passing through the center of gravity of the body of the device.

Depending on the configuration of the body of such a device, the latter can include a second thrust sub-unit cooperating with the platform, the support means of the thrust unit being arranged to support said second thrust unit parallel to the first thrust sub-unit, while minimizing the distance between a median plane passing through the center of gravity of the body of the device and the direction of gaseous flow ejection through the ejection nozzle of each thruster.

In order to increase the maneuverability of such a propulsion device, the platform can be arranged so that the passenger's feet occupy a position in which the height relative to the bottom point of the device, when said passenger assumes a standing and substantially vertical position on said platform and the ejection nozzles of the thrusters are oriented towards the ground, is:

substantially equal to or greater than the height relative to said bottom point of the center of gravity of the body of the device, and less than the height relative to said bottom point of the center of gravity of the assembly including the device and the passenger.

In order to protect the thrust unit of such a propulsion device, the body thereof can comprise projecting means cooperating with the platform and arranged to prevent any shock or direct contact between the ground and the thrust unit of the device.

According to a first embodiment, one of said thrusters can be a propeller thruster.

As a variation, according to another embodiment, one of said thrusters can be a turbojet.

Advantageously, so as not to impair the movement of the propulsion device, the thrusters of the thrust unit can be arranged counter-rotating.

As a variation or in addition, the support means and/or the thrusters of the thrust unit can be arranged so as to orient the direction of gaseous flow ejection through the respective ejection nozzles of said thrusters at an angle of between −45° and +45° with an axis parallel to a median axis of the platform.

In order to preserve the physical integrity of the passenger, a propulsion device according to the invention can comprise a fairing, cooperating with the platform or forming with said platform one physical entity, arranged to prevent any direct contact between the thrust unit and the passenger. In addition, said fairing can comprise a grating arranged to partially conceal the fluid inlets of the thrusters of the thrust unit and thus prevent the aspiration of foreign bodies through said fluid inlets.

In order to be able easily to operate the propulsion device, particularly along curved trajectories, the thrust unit can comprise course-correction secondary thrusters, the support means of the thrusters being arranged to cooperate with said course-correction secondary thrusters. Said support means can advantageously be arranged to keep the latter in an orientation that is substantially parallel to a longitudinal plane of the platform.

Depending on the configuration of the platform, particularly if the latter is extended, like the frame of an equivalent terrestrial vehicle such as a motorcycle or motor vehicle, the passenger may not sufficiently influence the attitude of the platform merely by the orientation of his body. In order to facilitate the operation of such a propulsion device, the thrust unit can comprise attitude-correction secondary thrusters, the support means of the thrusters being arranged to cooperate with said attitude-correction secondary thrusters. Said support means can advantageously be arranged to keep the latter in an orientation that is substantially normal to a longitudinal plane of the platform.

In order to supply the thrust unit of a propulsion device according to the invention, said device may advantageously also comprise a fuel tank in fluid communication with the thrusters of the thrust unit to supply said thrusters with fuel, said tank cooperating with the body of the device or the passenger.

So that the passenger can carry such a tank himself, like a backpack, such a tank can comprise a flexible envelope and a harness to cooperate with the body of the passenger, the fasteners of which are provided so as to be easily released by said passenger in an emergency situation.

So that said passenger can operate his propulsion device, the latter may comprise a man/machine interface of instructions translating a gesture of the passenger into an instruction, means for processing said produced instruction and for generating a power command of the thrusters based on said produced instruction, said thruster power command being conveyed to the thrust unit by communication means.

Such a propulsion device can also comprise an attitude and/or trajectory sensor cooperating with the body of the device substantially in the position of the center of gravity thereof and with the processing means, the latter generating the power command of the thrusters from information delivered by the attitude and/or trajectory sensor together with an instruction produced by the man/machine interface.

When the device comprises course-correction secondary thrusters, in order to relieve the passenger of a propulsion device according to the invention from performing a manual compensation for losses of course connected chiefly with meteorological conditions, the processing means, present on the body of the device, can generate power commands of said course-correction secondary thrusters based on information delivered by the attitude and/or trajectory sensor in order to activate one of said secondary thrusters and maintain the current trajectory of said body, in the absence of an instruction produced by the man/machine interface.

Similarly, when the device comprises attitude-correction secondary thrusters, in order to relieve the passenger of a propulsion device according to the invention from performing a manual compensation for losses in maintaining the attitude connected chiefly with meteorological conditions, the processing means, present on the body of the device, can generate power commands of said attitude-correction secondary thrusters based on information delivered by the attitude and/or trajectory sensor in order to activate one of said attitude-correction secondary thrusters and maintain a substantially horizontal attitude of said body, in the absence of an instruction produced by the man/machine interface.

By way of example of a preferred embodiment, such a man/machine interface of instructions can comprise a trigger that can be activated by one or more fingers of the passenger. The processing unit can then generate a power command of the thrusters in order to adjust the power generated by the thrust unit according to the travel of said trigger.

As a variation or in addition, said man/machine interface of instructions could comprise an angular measurement sensor measuring the angle described by a wrist of the passenger in relation to the longitudinal axis of the forearm concerned compared to a reference position in which the passenger's hand is aligned with said forearm. The processing unit can consequently generate a power command of the secondary thrusters in order to adjust the power generated by the latter according the travel of the wrist.

In order to hold the passenger on the body of a propulsion device, the latter can advantageously include means to ensure that said passenger is hold on the platform.

Further features and advantages will emerge more clearly from the following description and by examining the accompanying Figures, in which:

FIG. 1, previously described, shows a device for propelling a passenger that uses a fluid compressed by a remote compression station according to the prior art;

Figure 2A:
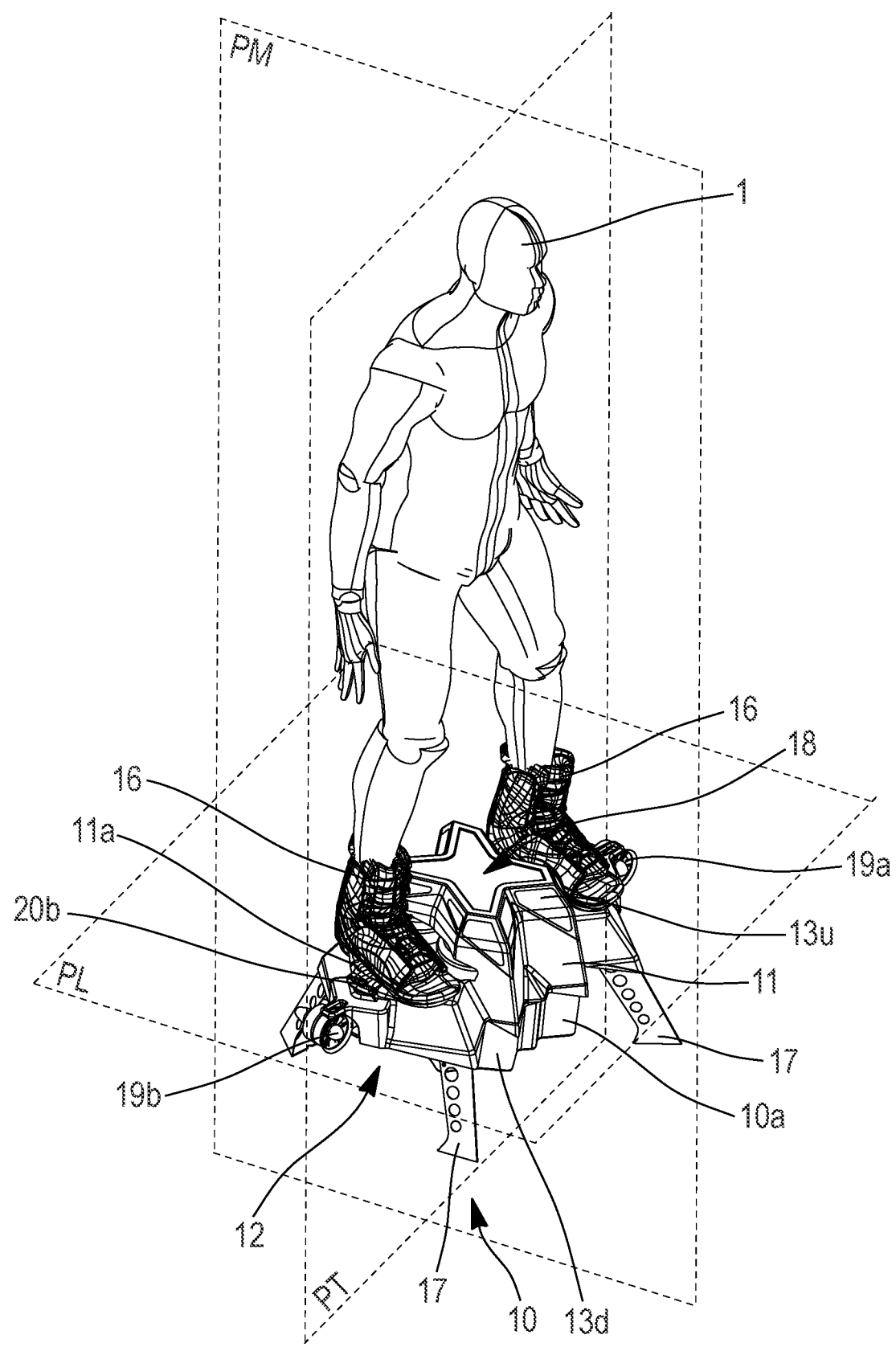
FIGS. 2A, 2B, 2C, 2D, 2E and 2F illustrate a first embodiment of a device for propelling a passenger according to the invention of which the dimensions of the platform are close to those of the platform of a device described in relation to FIG. 1.

FIG. 2A shows a perspective view of a preferred first embodiment of a device 10 for propelling a passenger 1 according to the invention. Such a device 10 comprises a main body 10a mainly in the form of a platform 11 on which a passenger 1 can take up position Depending on the dimensions of the platform 11 and the power of the thrust unit 12 of the device 10, the invention envisages that several passengers may possibly take up position on said platform 11 at the same time. The platform 11 has, for this purpose, one or more surfaces 11a and 11b arranged to receive the feet or shoes of the passenger 1, as shown more clearly specifically in FIG. 2D.

The invention envisages that such surfaces 11a and 11b can comprise means 16 for holding the passenger 1 on the platform 11. Thus, depending on the position desired by said passenger 1 on the platform 11 of a device 10 according to the invention, said holding means 16 could consist in a pair of fixing shoes or boots of a type similar to that which can be found, for example, in the practice of wakeboarding. Other types of holding means could be preferred, depending on whether a passenger is to be hold in a "legs bent" position, kneeling, or even sitting.

Such a platform 11 can advantageously be made from one or more materials having, alone or in combination, sufficient rigidity to support the weight of the passenger(s) and thus prevent any excessive deformation.

Figure 2B:
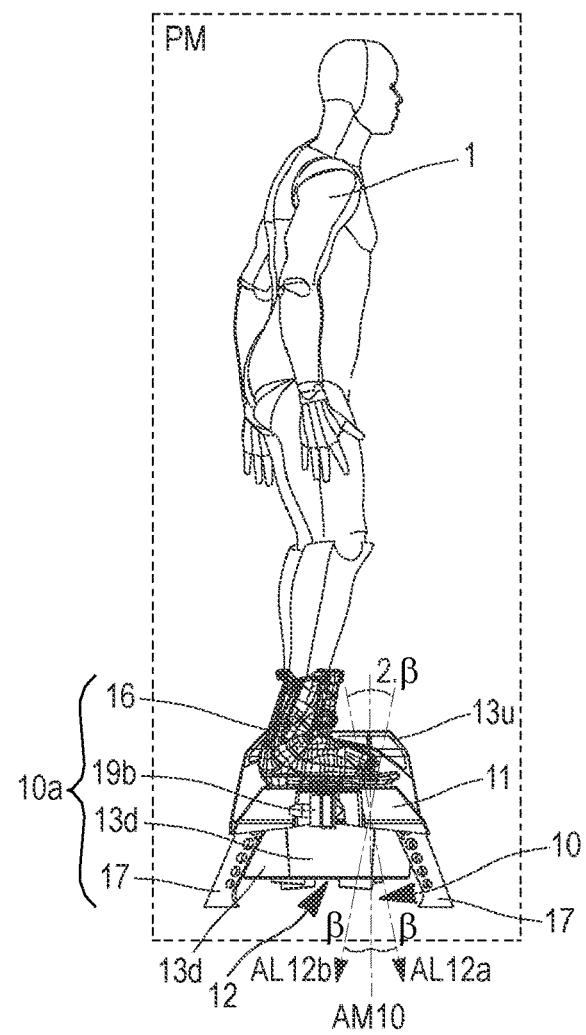
Figure 2C:
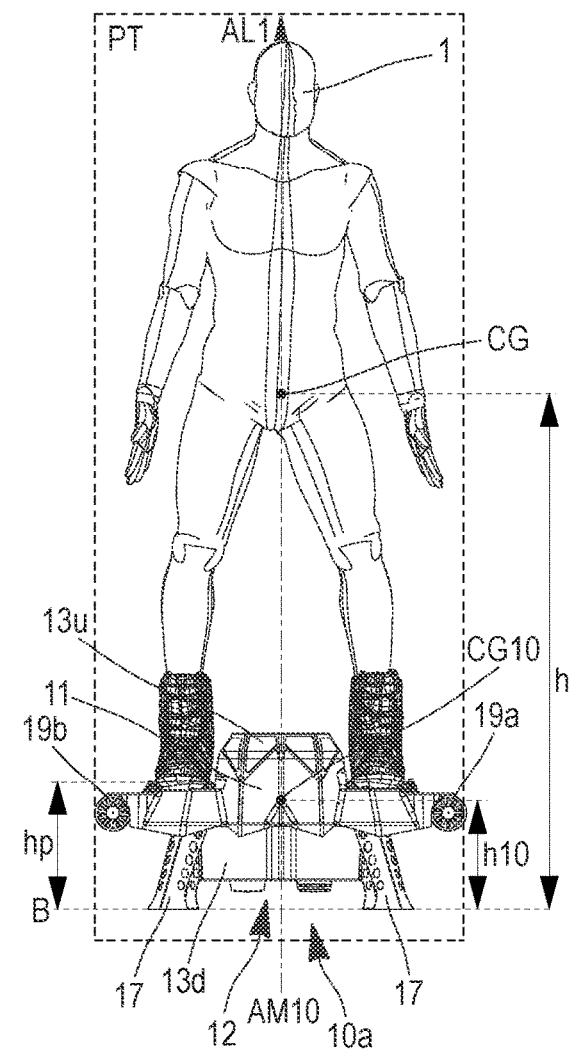
Figure 2F:
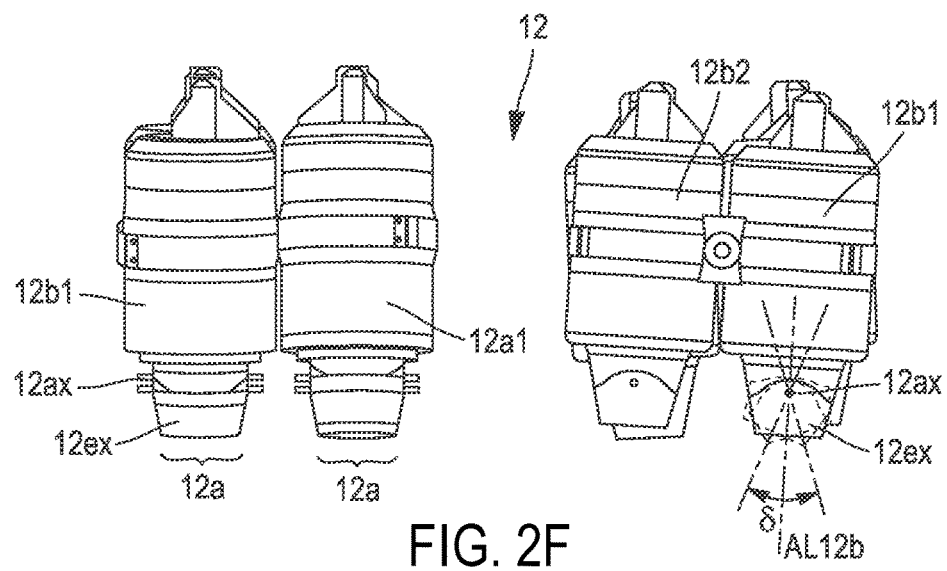
Figure 2D:
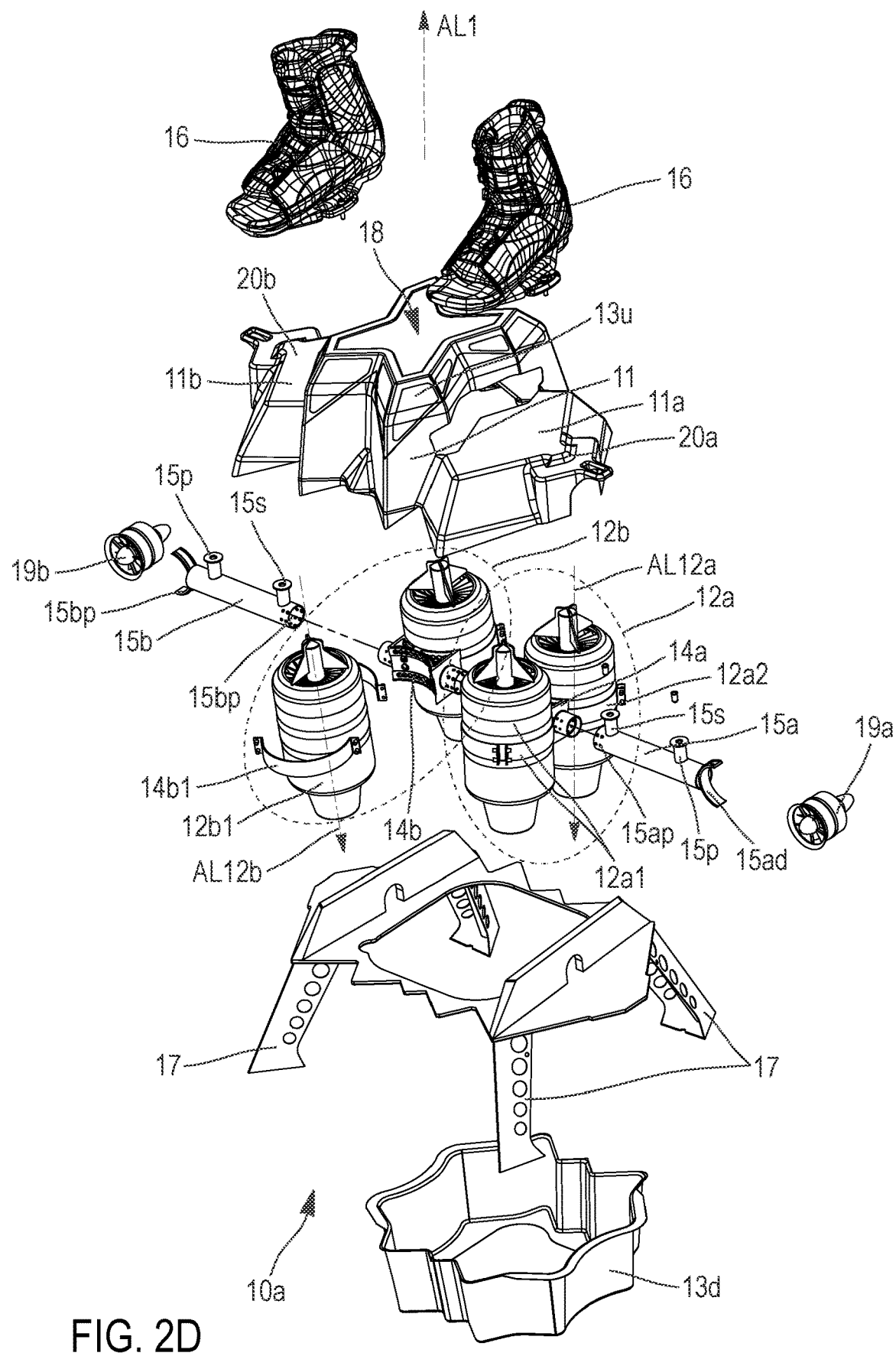

The body 10a of the propulsion device 10 described in relation to FIGS. 2A and 2D comprises a thrust unit 12 cooperating with the platform 11.

Throughout the rest of this document, the phrases below shall have the following meanings:

"median plane" PM means any plane normal specifically to the platform 11, which separates a port half from a starboard half of the body 10a of the device 10, said halves not necessarily being equal;

"transverse plane" PT means any plane normal to a median plane, which separates the body 10a of the propulsion device 10 into two halves, one including the front, and the other including the back of said body, said halves not necessarily being equal;

"longitudinal plane" PL means any plane normal to the transverse and median planes, said longitudinal plane separating an upper half from a lower half of the body 10a of the device 10, said halves not necessarily being equal.

Such planes PM, PT, PL are shown by dotted lines in FIG. 2A. Similarly, we call a:

"transverse axis" any axis belonging both to a transverse plane and a longitudinal plane;

"longitudinal axis" any axis belonging both to a median plane and a longitudinal plane;

"median axis" any axis belonging both to a median plane and a transverse plane.

A propulsion device 10 according to the invention comprises other accessory elements, not shown in the interest of simplicity in FIG. 2A, such as a fuel tank, to supply the thrust unit 12, or a man/machine interface of the remote-control type for example, so that the passenger 1 can interact with the thrust unit 12 of said device 10. Such a man/machine interface will be described in connection with FIG. 5.

FIGS. 2B, 2C and 2D illustrate such a first propulsion device 10 according to the invention, in profile and in front view respectively. Such a device has dimensions very close of those of a Flyboard shown, as an example of the prior art in relation to FIG. 1. We can see, in the light of FIGS. 2A, 2B and 2C, that the body 10a of such a device 10 comprises projecting means 17, advantageously and possibly retractable in flight, cooperating with the platform 11 and arranged so as to prevent any shock or direct contact between the ground and the thrust unit 12 of the device 10. Such means 17 can consist specifically in four feet of sufficient length as to prevent the ejection nozzles of the thrust unit 12 from hitting the ground and also to offer a certain stability, when the device is on the ground or on a takeoff station, not shown in FIGS. 2A to 2C, so that the passenger can effectively take up position on the platform 11. As a variation, such means 17 could consist in a pair of skis or other elements capable of ensuring a certain stability depending on the nature of the ground or the support of the device.

FIG. 2D shows an exploded view of a body 10a of such a device 10 according to the invention.

As said FIG. 2D shows and by way of non-limiting example, unlike known devices, the thrust unit 12 advantageously consists in a pair of thrust sub-units 12a and 12b each comprising two thrusters. Thus, a first thrust sub-unit 12a comprises two thrusters 12a1 and 12a2. The same applies to thrust sub-unit 12b, which comprises two thrusters 12b1 and 12b2. As a variation, such sub-units could comprise more than two thrusters. According to a second variation, the thrust unit 12 could advantageously comprise more thrust sub-units, themselves comprising one or more thrusters. The configuration example described in relation to FIG. 2D, although not limiting the invention, has certain qualities as regards other configurations of the thrust unit. In fact, a device 10 could move with a thrust unit reduced to just one thruster, of the thermal turbojet type, for example. However, this configuration would be too large to enable the passenger 1 to be able to move easily as he would do if moving on a Flyboard. In fact, the length of such a single thruster, to enable the latter to deliver a thrust sufficient to propel into the air the device 10 and its passenger 1, would be on the order of one meter, or even longer. Similarly, we can imagine a thrust unit 12 comprising two sub-units, each comprising only one thruster. The bulk of each thruster would be reduced, but such a thrust unit 12 would retain a major drawback in terms of safety, like the single-thruster configuration previously described. In fact, if one of the two thrusters were to malfunction, the total thrust of the unit would be insufficient to keep the passenger 1 in the air and to preserve sufficient maneuverability.

Unlike these two possible configurations, one configuration, as shown in relation to FIG. 2D, according to which a thrust unit 12 comprises at least two thrust sub-units 12*a* and 12*b* each comprising at least two thrusters 12*a*1 and 12*a*2 for one and 12*b*1 and 12*b*2 for the other, offers a particularly interesting compromise.

Thus, the space occupied by the four thrusters, for example jet engines, is completely compatible with the desired methods of use. Moreover, the propulsion device 10 is perfectly maneuverable, even if one of the thrusters were to malfunction.

In order to offer conditions of maneuverability close to those of a Flyboard, the thrusters of the thrust unit 12 are advantageously positioned as close as possible to the center of the body 10*a* of the device 10. Thus, preferably, as FIGS. 2C and 2D show, the surfaces 11*a* and 11*b* arranged on the platform 11 to receive the feet or shoes of the passenger 1 will advantageously be positioned on either side of said thrust unit 12. This reduces the moment of inertia that the passenger must overcome in order to change, with the aid of his body, the attitude of the device 10 and thus move:

- straight ahead, if he places the weight of his body towards the front of the device 10;
- backwards, if said passenger 1 places the weight of his body towards the back of the device 10;
- diagonally forwards, if said passenger 1 places the weight of his body towards the front of the device 10 and on one or the other side thereof;
- diagonally backwards, if said passenger 1 places the weight of his body towards the back of the device 10 and on one or the other side thereof.

In order to be able specifically to pivot easily and move through curves, the thrust unit 12 can advantageously comprise two secondary course-corrector thrusters 19*a* and 19*b*. The latter are advantageously arranged eccentrically along a transverse axis of the platform. By being activated in a non-simultaneous manner, these thrusters respectively create sufficient torque to develop a curved trajectory. As a variation or in addition, in order to do away with using said secondary thrusters, the invention envisages being able to add to all or some of the thrusters of the thrust sub-unit(s) 12*a*, 12*b* an orientable fluid outlet, of a cone type for orienting a fluid outlet of a jet ski for example, that would cooperate with the gaseous-flow ejection nozzle or the thruster(s) concerned, via one or more adapted respective mechanical connections, such as pivoting or embedded connections.

The various thrusters of the thrust unit are hold and supported by support means 14, an example of the structure of which will be described later. These means 14 constitute the functional equivalent of a frame supporting the platform 11 and cooperating via an advantageous mechanical connection having no degree of freedom or embedded connection with the projecting means 17, providing a base and protection for the thrust unit 12 of such a device 10.

In relation to the embodiment described in FIG. 2D, the body 10*a* of a propulsion device 10 according to the invention can comprise a fairing 13*u*, possibly in the form of one or more fairing elements connected to one another, cooperating with the platform 11 and/or the support means 14, by means of any reversible or irreversible (welding, screwing, for example) embedded mechanical connection or constituting with said platform 11 and/or support means 14 a single physical entity. The function of such a fairing 13*u* is to prevent any direct contact between the thrust unit 12 and the passenger 1. The morphology (dimensions, shape) of such a fairing 13*u* will thus be arranged to match the dimensions of the thrust unit 12, confer an aesthetic appearance and/or promote the aerodynamics of the propulsion device, while limiting any inconvenience to the passenger. It is indeed important to be able to limit any contact between the passenger and the thrust unit in order to prevent any risk of injury to him, since the temperature of the external walls of the thrust unit 12 can rapidly become very high. Furthermore, the upper part of the body 10*a* of the device 10, located substantially between the feet of the passenger 1, includes a fluid inlet 18, in this case an air inlet, to supply the thrusters with fluid via their respective fluid inlets. The thrusters in fact include rotors that could injure the passenger 1 should he inadvertently insert his hand in the fluid inlet 18. Moreover, the aspiration of foreign bodies (leaves, debris, birds, etc.) through said fluid inlet 18 could affect the operation of the thrust unit 12. For this reason, said fairing 13*u* can advantageously include a grating, not shown in FIG. 2D, the configuration of which allows said inlet 18 to be partially concealed and thus limit or prevent the aspiration of foreign bodies through said air inlet 18, while preserving the fluid exchange between the outside world and the thrusters. FIG. 2D also illustrates the use of a lower fairing 13*d*, cooperating by means of any embedded mechanical connection, also performing the function of protecting the passenger or the surrounding environment of the fluid outlets or gas ejection nozzles of the thrusters of the thrust sub-units 12*a* and 12*b*. In fact, the temperature can be particularly high within the immediate vicinity of said ejection nozzles. Such an open fairing affords circumferential or lateral protection. Like the fairing 13*u*, which we can call the upper fairing, the geometry of said fairing 13*d* can also be advantageously designed so as not to affect the gaseous ejection of the thrust unit and so as to improve the aerodynamics of the body 10*a* of the device 10. The choice of material(s) envisaged to form said fairing elements 13*u* and 13*d* will depend on the maximum temperature of the thrust unit 12 within the immediate vicinity of said fairing elements, so as to ensure that said temperature does not damage their structure.

FIG. 2D also shows the presence of course-correction secondary thrusters 19*a* and 19*b* located laterally, not centrally, unlike the thrust sub-units 12*a* and 12*b*. We will now describe the contribution made by said secondary thrusters in relation to the detailed presentation of an example of a thrust unit illustrated in FIG. 2E.

In the interest of simplicity, FIG. 2D does not show the majority of the electronic elements. As an example, as we shall see in the description of the thrust unit 12 in relation to FIG. 2E, the body 10*a* of a propulsion device 10 according to the invention comprises or cooperates with means for processing instructions from the passenger to control the power of the thrusters. Moreover, such processing means can also cooperate with or include one or more sensors, such as, non-exhaustively, an inclinometer, an accelerometer, an altimeter, a Global Positioning System (GPS) receiver, a Pitot probe or tube and/or a gyroscope, capable of delivering information about the attitude, speed or more generally the trajectory of the body 10a of the device 10. Said processing means are thus arranged to generate the power commands of the thrusters of the thrust unit 12, specifically the thrusters of the thrust sub-units 12a and 12b, based on the passenger's instructions and/or information produced by said sensors. The same applies to generating the power commands of the course-correction secondary thrusters 19a and 19b. Said processing means can take the form of one or more electronic cards, advantageously positioned near the center of inertia CG10 of the body 10a of the propulsion device 10, particularly if the sensors are included in said electronic card(s). FIG. 2C shows specifically the virtual position of said center of gravity CG10 of the body 10a of the embodiment of the propulsion device 10. Throughout the rest of this document, we will consider the terms "processing means of the body of the propulsion device or present in said body" as covering any arrangement that specifically makes it possible to:

fix said processing means in or on said body 10a, for example on the platform 11 and/or the support means 14, 15a, 15b, and/or connect said processing means by a terminal block or coupling to said sensors and/or thrusters, when said processing means are arranged to be connected and/or disconnected by the passenger and/or carried by said passenger.

Figure 2E:
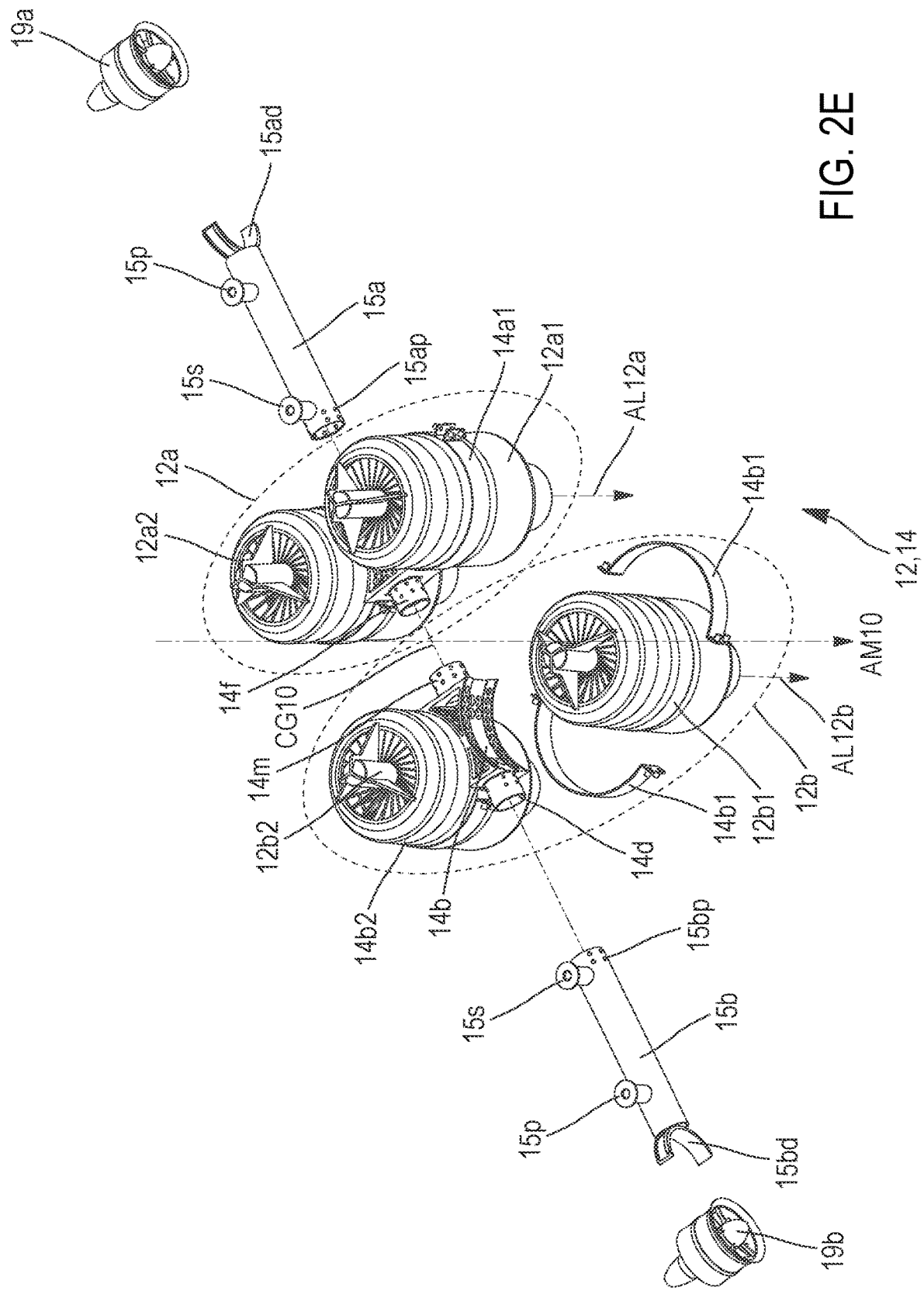

In relation to FIGS. 2C and 2E, we will now study the structure of a preferred embodiment of a thrust unit 12 of a propulsion device 10 according to a first embodiment of the invention and the support means 14 of such a thrust unit.

As stated previously, such a thrust unit 12 comprises two thrust sub-units 12a and 12b each comprising two thrusters, referenced 12a1 and 12a2 for the first and 12b1 and 12b2 for the second.

Such thrusters can consist in thrusters with propellers or rotors, or advantageously and in this case, as shown in FIG. 2E, turbojets. A turbojet is a thermal engine, commonly used in aeronautics, which converts the potential energy contained in a fuel, such as kerosene or the equivalent, associated with a combustion agent, in this case the ambient air aspirated through the fluid inlet 18 of the body 10a, into kinetic energy. This kinetic energy generates a reaction force in an elastic medium, in the opposite direction to the ejection of a gaseous discharge. This results in an acceleration of a certain quantity of air between the fluid inlet of the thruster and the ejection nozzle thereof, producing a thrust by expansion in said ejection nozzle. Such a thruster uses an air compressor with blades or rotors. Any other type of fuel could be used instead of the above-mentioned kerosene.

According to FIGS. 2C, 2D and 2E, we can see that each thruster of the thrust sub-units 12a and 12b is orientable and, in nominal operation, oriented, along an axis AL12a (for thruster 12a2) or AL12b (for thruster 12b1) substantially normal to a longitudinal plane of the platform 11, i.e. substantially parallel to a longitudinal axis AL1 of the passenger 1. Said thrusters are also oriented so that the ejection nozzle of each of said thrusters discharges a gaseous flow in an opposite direction to that of said oriented longitudinal axis AL1 going from the feet towards the head of the passenger 1. In this way, the thrusters "push" said passenger 1 via the platform 11. As stated above, specifically in order to improve the handling of the device 10, the main body 10a thereof comprises support means 14 of the thrust unit 12, cooperating with the platform 11, arranged to support said thrust unit 12 by concentrating the thrusters as close as possible to the center of the body 10a. Thus, said support means 14 minimize as far as possible the distances between the directions of gaseous flow ejection AL12a, AL12b from the respective ejection nozzles of the thrusters 12a1, 12a2, 12b1, 12b2 and the respective orthogonal projections of said directions in a virtual median plane PM passing through the center of gravity CG10 of the body 10a of the device 10, said directions of gaseous flow ejection being substantially parallel to said median plane PM. In the case of such a device, more precisely, the support means 14 are arranged to minimize the distance between said ejection directions and a virtual median axis AM10 of the body 10a passing through said center of gravity CG10. Thus, the moment of inertia that the passenger must overcome in order to change, with the aid of his body, the attitude of the body 10a and consequently the trajectory of the propulsion device 10 is reduced. The entertainment gained by using such a propulsion device is thus increased. According to the preferred example shown in FIGS. 2C, 2D and 2E, the center of gravity CG10 of the body 10a is substantially located in the center of the thrusters of the two thrust sub-units 12a and 12b. By way of a preferred but non-limiting example, the support means 14 can comprise one plate per thrust sub-unit on which are mounted, by an embedded type mechanical connection, collars respectively encircling the thrusters of each sub-unit. In this way, the thrusters of the same thrust sub-unit are retained integrally and are oriented along parallel longitudinal axes. Thus, two collars 14b1 and 14b2 encircle thrusters 12b1 and 12b2 respectively. The two collars are also fixed onto a plate 14b. The same applies to the thrusters of the sub-unit 12a. Two collars 14a1 and 14a2 encircle thrusters 12a1 and 12a2 respectively. The collars cooperate with a plate 14a, for the most part hidden in FIG. 2E. The thickness of said plates 14a and 14b is reduced in the middle to a minimum so that the thrusters of the same sub-unit are as close to one another as possible. Similarly, the support means 14 are arranged so that the proximal parts of said plates can cooperate, in such a way that said thrust sub-units are as close together as possible. Said proximal parts 14m, for the plate 14b and 14f, for the plate 14a, can advantageously each describe a hollow cylinder. The sections of said cylinders are also advantageously chosen so that one of said proximal parts penetrates the second one. With the aid of through-holes in each cylinder along an axis normal to the axis of revolution of said proximal parts 14f and 14m, and of a pin for example, it is possible to connect the two thrust sub-units together. As a variation, it would be possible to create an embedded type mechanical connection by welding in order to connect the two plates 14a and 14b together. These two plates allow the distance separating each thruster of the thrust sub-units 12a and 12b to be reduced to a minimum from a median plane of the platform 11 passing through the center of gravity CG10 of the body 10a of the device 10.

When the thrusters of the two thrust sub-units comprise compressor rotors mounted counter-rotating, the ejection directions of the thruster nozzles, for example the directions referenced AL12a and AL12b in FIG. 2E, can be parallel to one another and substantially normal to a longitudinal plane of the platform 11.

Otherwise, the rotation of the rotors within each thruster could cause a rotation about itself of the thrust unit 12 and, consequently, of the body 10a of the device 10. In order to overcome this drawback, the invention envisages that the support means 14 can be arranged so as to orient the direction of gaseous flow ejection through the ejection nozzle of each thruster of each thrust sub-unit 12a and 12b, so that said direction of gaseous flow ejection describes an angle β of between −10° and +10° with a median axis AM10 of the platform 11 or of the body 10a. As shown in FIG. 2B, it is possible to slightly intersect said ejection directions of the two sub-units 12a and 12b forming an angle resulting from the double of β, referenced "2.β" in FIG. 2B. An angle β with an absolute value of four degrees is sufficient to cancel out the effect previously mentioned, if the thrusters are not mounted counter-rotating, without over-penalizing the effective power of the thrust unit 12. Other values of β could be adopted as a variation. As indicated in FIG. 2E, multiple holes in the proximal parts 14m and 14f of the plates 14a and 14b allow the desired angle β to be chosen. As a variation, as mentioned above, the plates can be oriented, in relation to one another, in the factory, by welding.

In order to connect to the thrust sub-units 12a and 12b the course-correction secondary thrusters 19a and 19b and thus enable curved trajectories, the support means 14 of a device 10 according to the invention cooperate with secondary support means 15a and 15b in order to cooperate with the course-correction secondary thrusters 19a and 19b and keep the latter in a thrust orientation substantially parallel to a longitudinal axis of platform 11. Thus, as FIG. 2E shows by way of non-limiting example, the plates 14a and 14b can cooperate with the arms 15a and 15b respectively, or more generally with the lateral extensions. According to said FIG. 2E, the plates 14a and 14b comprise distal parts 14d, diametrically opposite the previously mentioned proximal parts. Like the latter, said distal parts have a hollow circular section substantially smaller or larger than those of the proximal parts 15ap and 15bp of said extensions 15a and 15b. Thus, the plates and extensions can cooperate by means of an embedded connection, possibly achieved by welding, or by means of pins passing through through-holes made in said distal parts 14d of the plates 14a and 14b and proximal parts 15ap and 15bp of the extensions 15a and 15b. Thus, said latter configuration allows the relative orientation of the extensions in relation to said plates to be adjusted. Each extension 15a or 15b comprises a distal part 15ad or 15bd arranged to encircle or more generally hold a course-correction secondary thruster 19a or 19b. Preferably, such a secondary thruster can consist in one or more electric turbines. Such a technological choice provides course-correction secondary thrusters 19a and 19b that are particularly responsive, more so than certain thermal thrusters, such as turbojets.

However, an arrangement of course-correction thermal thrusters 19a and 19b could consist in using a turbo-thruster, instead of each electric turbine, substantially oriented parallel to the thrusters of the thrust sub-units 12a and 12b. In order to preserve high responsiveness, an orientable fluid outlet, of a cone type for orienting a fluid outlet of a jet ski, could cooperate with the gas ejection nozzle of the thermal secondary thruster. By orienting said cone in a median plane of the platform 11, a total outcome is obtained that is very close to that achieved by using electric turbines.

When the body 10a of a propulsion device according to the invention advantageously comprises means for processing not only the instructions of the passenger 1, but also of attitude and/or trajectory sensors of said body 10a in space, the invention envisages using the presence of course-correction secondary thrusters 19a and 19b to assist said passenger to maintain a course, specifically if the climatic conditions are unfavorable. In fact, a strong and irregular wind can cause the propulsion device to assume a yaw trajectory, against the wishes of the passenger. He can compensate with the aid of an instruction interface, as we will explain later in relation to FIG. 5, but this compensation can be tiresome in the long run. The invention thus proposes to adapt the processing means present in the body 10a so that they generate the power commands intended for the course-correction secondary thrusters 19a and 19b, in order for the latter, in the absence of instructions from the passenger signifying a desired change of trajectory, to maintain the current course. By way of example, when a gust of wind tends to give the propulsion device 10 a yaw trajectory on the passenger's right-hand side, said processing means, present on the body 10a, generate a power command intended for the course-correction secondary thruster 19b, i.e. the one positioned on the right-hand side of the passenger 1, by activating said secondary thruster 19b sufficiently to cancel out this unexpected change of trajectory. Said course-correction secondary thruster 19b is switched off as soon as the nominal trajectory is recovered. In this way, the propulsion device 10 automatically maintains its current trajectory and relieves said passenger from any effort of compensation. The choice of favoring electric secondary thrusters is especially justified by this embodiment, bearing in mind the high responsiveness required for such course-correction secondary thrusters 19a and 19b for them to compensate for meteorological disturbances, without the passenger's knowledge.

Furthermore, the embodiment of a thrust unit 12 supported by support means 14 of a device 10 described in relation to FIG. 2E shows said support means 14 as comprising extensions 15a and 15b having a pair of protuberances or spacers 15p and 15s respectively. The latter are positioned along an axis normal to the longitudinal axis of each extension 15a or 15b so as to cooperate with the platform 11. The latter can thus be fixed by screwing, said protuberances being threaded in this case. Any other method of cooperation between the support means 14 the platform 11 could be envisaged according to the invention.

According to FIG. 2E, the protuberances 15p and 15s are positioned respectively on the extension 15a or 15b respectively near the distal and proximal parts of said extension. In addition to having a function of assembly with the platform 11, these protuberances make it possible to determine the relative height of the surfaces 11a and 11b created on the platform 11 to receive the feet of the passenger 1 in relation to the center of gravity CG10 of the body 10a of the propulsion device 10.

It has been determined, after confidential private tests and prototyping, that said relative height of said surfaces 11a and 11b in relation to the center of gravity CG10 of the body 10a influences the handling of the propulsion device 10. Thus, as shown specifically in FIG. 2C, it is particularly advantageous to arrange the platform 11 so that said surfaces have a height hp relative to the low point B (determined by the distal parts of the protruding means 17) of the body 10a of the device 10, when said passenger 1 occupies a substantially vertical position and when the ejection nozzles of the thrusters of the thrust sub-units 12a and 12b are oriented towards the ground:

substantially equal to or greater than the height h10, relative to said low point B, of the center of gravity CG10 of the body 10a of the device 10, and less than the height h, relative to said low point B, of the center of gravity CG of the assembly including the device 10 and the passenger 1.

Thus, the respective heights of said protuberances 15p and 15s enable this configuration to be adjusted by regulating said height hp. The surfaces 11a and 11b located a few centimeters above the center of gravity CG10, as shown in FIG. 2C, confer great handling on the propulsion device 10.

In order to supply fuel to the main thrusters, i.e. the thrusters of thrust sub-units 12a and 12b, the invention envisages that said fuel could be carried in one or more tanks, not shown in the Figures in the interest of simplicity. By way of non-limiting example, such a tank can comprise a rigid or flexible envelope, a filling opening and a drainage opening. It is thus possible to provide such a tank with liquid or gaseous fuel via the filling opening. By way of non-limiting example, such a fuel can be kerosene, currently commonly suitable for conventional thrusters. However, other fuels could be used as a variation. Said fuel is then delivered by said tank via the draining opening arranged to cooperate with a supply pipe, not shown in the Figures in the interest of simplicity, the ends of which are connected respectively to the tank, more precisely to the draining opening, in order to collect the fuel and to a collector means, also not shown in the Figures, in order to supply the thrusters with fuel. Such a collector means provides each thermal thruster with fuel. It thus cooperates via fluid connection with said thrusters and the tank.

Such a tank can be designed to be carried by the passenger, as a backpack or parachute, by means of straps or a harness, if possible of the Rallye type, in order to be able to jettison said tank immediately if a fire should start. Such a type of harness is in fact known for comprising fasteners designed to be released easily by the person caught in an emergency situation. Such a tank can also comprise a flexible envelope to increase the passenger's comfort and reduce the risk of injury to him in the event of a fall for example. As a variation or in addition, a tank can be fixed to the platform 11 or to the support means 14 of the thrust unit. According to a preferred embodiment, when the tank is provided to be carried by the passenger 1, the envelope of said tanks can advantageously be flexible, such as a bag previously degassed before being filled with fuel. Such a choice improves the comfort and safety of the passenger particularly in the event of a fall and prevents any risk of unpriming the supply of fuel to the thrusters.

The invention also envisages that a source of electrical energy can advantageously be embedded on the main body 10a of a propulsion device 10. Such a source can consist in one or more batteries and/or photovoltaic cells, the latter serving as secondary sources to supply the low-energy-consumption electronic elements, such as the means of processing the passenger's instructions and generating the power command of the thrust unit. By contrast, the course-correction secondary thrusters 19a and 19b previously described require a larger source, such as one or more batteries, if said secondary thrusters are electric.

Figure 5:
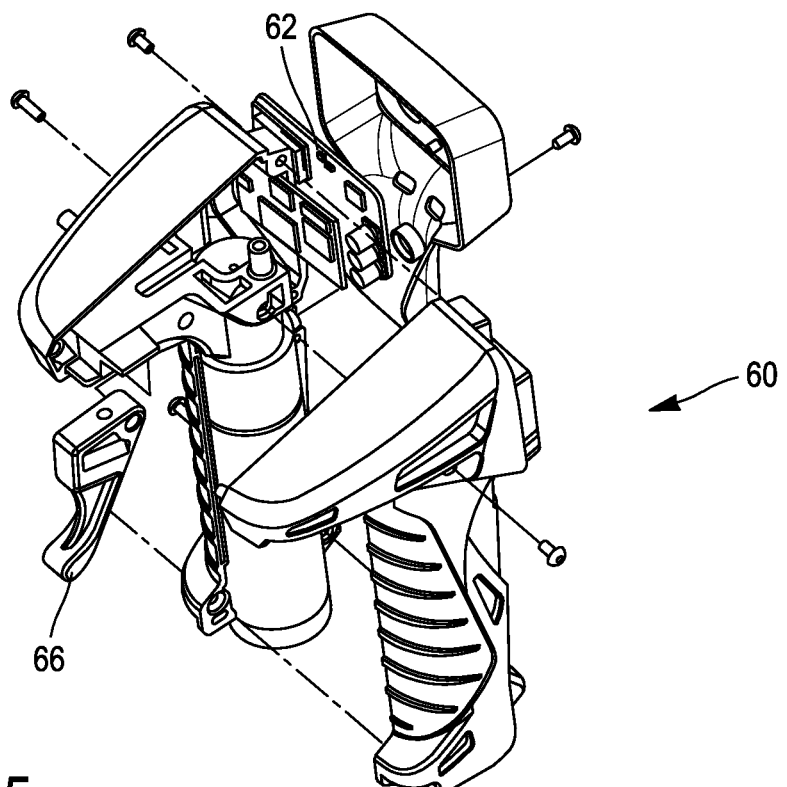
FIG. 5 illustrates an embodiment of a man/machine interface for transmitting instructions issued by the passenger to the control element of the thrust unit of a device according to the invention.

In order to be able to control the power of the thrust unit and also decide the trajectories of displacement, a passenger 1 of a propulsion device 10 according to the invention can advantageously use a man/machine interface of instructions, the prime function of which is to translate a gesture of said passenger 1 into a specific instruction. FIG. 5 shows an example of such a man/machine interface 60, in the form of a remote control provided to be held in the hand of the passenger 1 or an instructor during a training session. According to this non-limiting example, said interface 60 can be likened to a gun type remote control. It comprises specifically a trigger 66, the travel of which can be interpreted as an instruction to increase the power of the thrust unit 12, when the trigger is activated by the passenger 1 or the instructor, and to reduce said power when said trigger is gradually released by its user. Such an interface 60 can also comprise other elements such as one or more buttons, for example pushbuttons not shown in FIG. 5, possibly to establish instructions to start or stop the thrust unit 12, in order to cut the supply to one thruster or another. Said interface 60 can also include one or more sensors, such as a gyroscope, an inclinometer, or an angular measurement sensor measuring the angle described by one of the user's wrists whose hand is holding the interface 60 relative to the longitudinal axis of the forearm concerned compared to a reference position in which the hand of said user is aligned with his forearm. Thus, orienting the wrist inwards towards the user's body can indicate a desire for the device 10 to pivot towards the left, if said user is holding the interface 60 in his right hand. Conversely, an outward movement of his wrist could indicate a desire to orient the trajectory of said device 10 to his right. As a variation or in addition, the interface 60 can include an inclinometer. An inclination of said interface 60 towards the left or towards the right of its user can then translate into an orientation instruction of the trajectory of the device 10. Such an orientation instruction is then translated by power commands of the secondary thrusters 19a and 19b previously described. In order to interpret such gestures of its user, the interface 60, described by way of example in FIG. 5, comprises electronic means 62 for processing the different information collected, by the trigger 66 and other buttons and/or sensors of said interface 60, in order to produce instructions that can be interpreted by the means of processing such instructions onboard the body 10a of the propulsion device 10. In order to convey said instructions to said processing means, the interface 60 and said processing means present on the body 10a of the device 10 comprise wired or advantageously wireless communication means, for example by radio.

Said processing means, arranged to be advantageously positioned near the center of gravity CG10 of said body 10a, are arranged to generate power commands of the thrust unit 12 based on instructions produced by the interface 60. Each power command is advantageously conveyed to the thruster concerned by advantageously wireless communication means. In the interest of simplicity, such communication means are not shown in the Figures.

We can also mention that information relating to the operation of the thrust unit can be processed by said processing means and output to the passenger 1 via one or more graphic interfaces 20a and/or 20b, such as screens or lights, advantageously located on the platform 11 as shown in FIG. 2D, by way of non-limiting example, near surfaces 11a and 11b.

In order to assist the ignition or starting of the thrust unit 12 of a propulsion device 10 according to the invention, it may be advantageous to position the body 10a of said device 10 so that the thrusters of the thrust sub-units 12a and 12b are oriented substantially horizontally. In fact, the fuel, for example kerosene, has a tendency to flow before the ignition of the thrusters if the latter remain vertical. In this regard, the invention envisages a takeoff station arranged to allow the body 10a to tilt on starting the thrust unit 12, then to position said body 10a so that a passenger 1 can easily take up position on the surfaces 11a and 11b. As a variation, the invention envisages that the thrust unit 12 can be rotatably mounted along an axis transverse to the platform 11 to enable a rotation of 90° and thus resolve the drawback of having to orient the body 10a if the thrust unit 12 cooperates via an embedded connection with the platform 11. After starting up such a rotatably mounted thrust unit 12, the latter will be held fixed in relation to said platform 11, as shown in FIGS. 2A to 2C, by any means.

The invention also envisages a second embodiment of a propulsion device according to the invention. An advantageous example is shown in FIGS. 3A to 3F. The first and preceding example (described in relation to FIGS. 2A and 2E) is more often envisaged for entertainment applications for which the agility of the driver and/or passenger(s) is very often put to the test. To promote more linear and less acrobatic movements, the invention envisages reinventing the motorcycle as it is currently known. Although structurally and physically distinct, such a second example of the device is of similar design to that of the one described in relation to FIGS. 2A to 2E.

Such a "flying motorcycle" is shown specifically in FIGS. 3A to 3F, in perspective, front, rear, bottom and side views, for the last two, respectively. Such a device 10 comprises a platform 11, shown in a very simplified way in said FIGS. 3A to 3F, according to which only essentially a frame can be distinguished. The driver or passenger 1 can take possession of his machine like a conventional terrestrial motorcycle on a saddle 11a, not shown in the interest of simplicity, on the platform 11. The latter thus has one or more areas 11a on which said driver or passenger 1 could take up position, advantageously but not limited to the sitting position. The feet of the latter are supported by footrests 11d provided with automatic hooks cooperating with appropriate blocks beneath the shoes of the passenger 1, like a pedalboard with automatic pedals of a road cyclist. Concerning the device 10, the wheels have clearly disappeared and are replaced by a thrust unit 12 comprising, according to the example shown in relation to FIGS. 3A and 3D, six thrusters referenced 12a1 to 12a6, preferably thermal, like the thrusters of the thrust unit 12 previously described in relation to FIG. 2E. Unlike said thrust unit 12 described in relation to the first embodiment comprising two thrust sub-units 12a and 12b, as shown in FIG. 2E, the thrust unit 12 of this flying motorcycle comprises only one thrust sub-unit 12a comprising at least two thrusters, in this case six substantially identical thrusters. The invention would not be limited to this sole example of arrangement of the thrust unit 12. The number of thrusters of said thrust sub-unit 12a could be fewer or more than six. The same applies to the number of thrust sub-units. It could in fact be envisaged that said thrust unit 12 might comprise two rows or two thrust sub-units mounted substantially parallel to one another, like the device 10 described in relation to FIG. 2A, or even an example of a propulsion device as shown in FIG. 4 in a very simplified manner from a top view, for which the platform 11 and support means 14 are also extended widthwise. We shall see later, in relation to said FIG. 4, that the invention can also be applied to build a flying car.

The device 10, described in connection with FIG. 3A, may include, in an advantageous but non-limiting way, a preemption element 11c, equivalent to a motorcycle handlebar, on which to allow the passenger 1 to rest his hands. Such a handlebar 11c can comprise a gas control throttle lever 61 associated with an angular measurement sensor, for example in the form of a right or left grip mounted rotatably, depending on the preferences of the passenger 1. Such a gas control throttle lever 61 can be used like the trigger 66 of the remote control 60 previously shown in relation to FIG. 5. Such a throttle lever 61, or more precisely the sensor associated therewith in order to measure the travel, could advantageously enable transmission of a command to regulate the power of the thrust unit 12. The handlebar thus also plays a man/machine interface role in order to operate the machine. It could also comprise other instruction elements, such as buttons, not shown in FIG. 3A, to issue an order to start or stop the thrust unit 12 in particular.

Like a terrestrial motorcycle, said handlebar can also comprise one or two brake grips 63 to transmit a deceleration instruction of said thrust unit 12. Said handlebar 11c can be mounted rotatably, like that of a terrestrial motorcycle, and include a sensor tasked with delivering an angular measurement of the travel of said handlebar 11c. This sensor could process an instruction to change trajectory, particularly when the device 10 moves at a slow speed, i.e. at a few kilometers per hour. At higher speeds, we will see later that the device 10 will be more and/or solely responsive to the inclination of the body 10a of the device 10, an inclination imposed by a movement of the body of the passenger 1, in order to influence the trajectory and perform curved trajectories. The platform 11 or more generally the body 10a of the device 10 includes footrests 11d to accommodate the feet of the passenger 1. Preferably, as FIGS. 3A to 3F show, said footrests 11d arranged to accommodate the feet or shoes of the driver or passenger 1 are advantageously positioned on either side of said thrust unit 12. Such footrests 11d or only the right or left footrest can advantageously include a pressure sensor 64 to deliver information that could be converted into a deceleration instruction, said information being in addition or alternative to that resulting from the activation of the throttle lever 63, if any, of the handlebar 11c. Lastly, the second footrest, for example the left footrest, could include a sensor 65 sensitive to a rotation, about an axis transverse to the body 10a or the device 10, of said footrest. The passenger 1 pressing the front of his foot down could mean an instruction to incline the attitude of the device 10 to the front of the latter, which could thus "nose down." Conversely, activation of said footrest, by the passenger 1 pressing his heel down, could mean an instruction ordering the device 10 to rear up. Any other instruction interface could, instead of or in addition to the handlebar 11c and/or the footrests, be used. By way of non-limiting example, the invention thus envisages that electronic processing means, present on the body 10a of the device 10, can use information delivered by an inclinometer affixed to an item of clothing or an accessory of the passenger 1 or incorporated into said clothing or accessory. Thanks to the information delivered by such a sensor, when the passenger 1 tilts his torso forward towards the handlebar 11c, the inclination of the torso of said passenger 1 can be converted by said electronic processing means into an instruction to increase the power of the thrust unit 12, or an inclination of the thrusters of such a group 12, as we shall see later. Conversely, when the passenger 1 straightens up, an instruction to decelerate could be generated by the electronic processing means of the device 10. In order to generate such instructions and convert them into power commands of the thrusters, like the device 10 described in relation to FIGS. 2A to 2E, the device 10 described in relation to FIGS. 3A to 3F can also and advantageously include such electronic processing means (not shown in said Figures in the interest of simplicity) consisting for example in one or more microcontrollers or electronic cards arranged, i.e. programmed, to interpret information delivered specifically by the angular measurement sensor associated with the throttle lever 61, and the sensors 63, 64 and 65, and convert it into operating instructions. The device 10 can also include, non-exhaustively, an inclinometer, an altimeter, a GPS receiver, a Pitot probe or tube and/or a gyroscope, more generally any sensors allowing said electronic processing means to record the attitude, speed or trajectory of the body 10a of the device 10. For this, said sensors cooperate with said electronic means via any wired or wireless connection. They are moreover advantageously in certain cases, specifically by way of example, an inclinometer and/or a gyroscope, located substantially near the center of gravity CG10 of the body 10a. Such a sensor, not shown in said Figures, cooperates by wire or coupling, with the processing means taken together or in addition to those previously mentioned. Such means, consisting for example, if they are distinct, in one or more microcontrollers of electronic card(s), are advantageously arranged, i.e. programmed, to cooperate, by a wired connection or coupling, i.e. via a wireless connection by a short-range communication protocol such as Bluetooth or the equivalent, with the processing means arranged to produce one or more power commands, finally transmitted to certain thrusters of the device 10, based on information delivered by said attitude and/or trajectory sensor together with one of the instructions previously referred to and produced, thanks to a shared man/machine interface, unlike the remote control 60 previously described in relation to FIG. 5 that centralizes the main instruction elements, formed for example by the handlebar 11c and/or the footrests 11d or any other equivalent element, if the latter include sensors. Like FIG. 2A describing the embodiment of a first propulsion device according to the invention, FIG. 3A allows us also to define the different planes that we shall refer to alternately as "longitudinal", "transverse" or "median," referenced PL, PT and PM respectively in FIG. 3A, in the light of which we can describe in greater detail the arrangement of the body 10a of a second example of the propulsion device 10.

Thus:
"median plane" PM means any plane normal specifically to the platform 11, which separates a port half from a starboard half of the body 10a of the device 10, said halves not necessarily being equal;
"transverse plane" PT means any plane normal to a median plane, which separates the body 10a of the propulsion device 10 into two halves, one containing the front and the other containing the back of said body, said halves not necessarily being equal;
"longitudinal plane" PL means any plane normal to the transverse and median planes, said longitudinal plane separating a top half from a bottom half of the body 10a of the device 10, said halves not necessarily being equal.

Figure 3A:
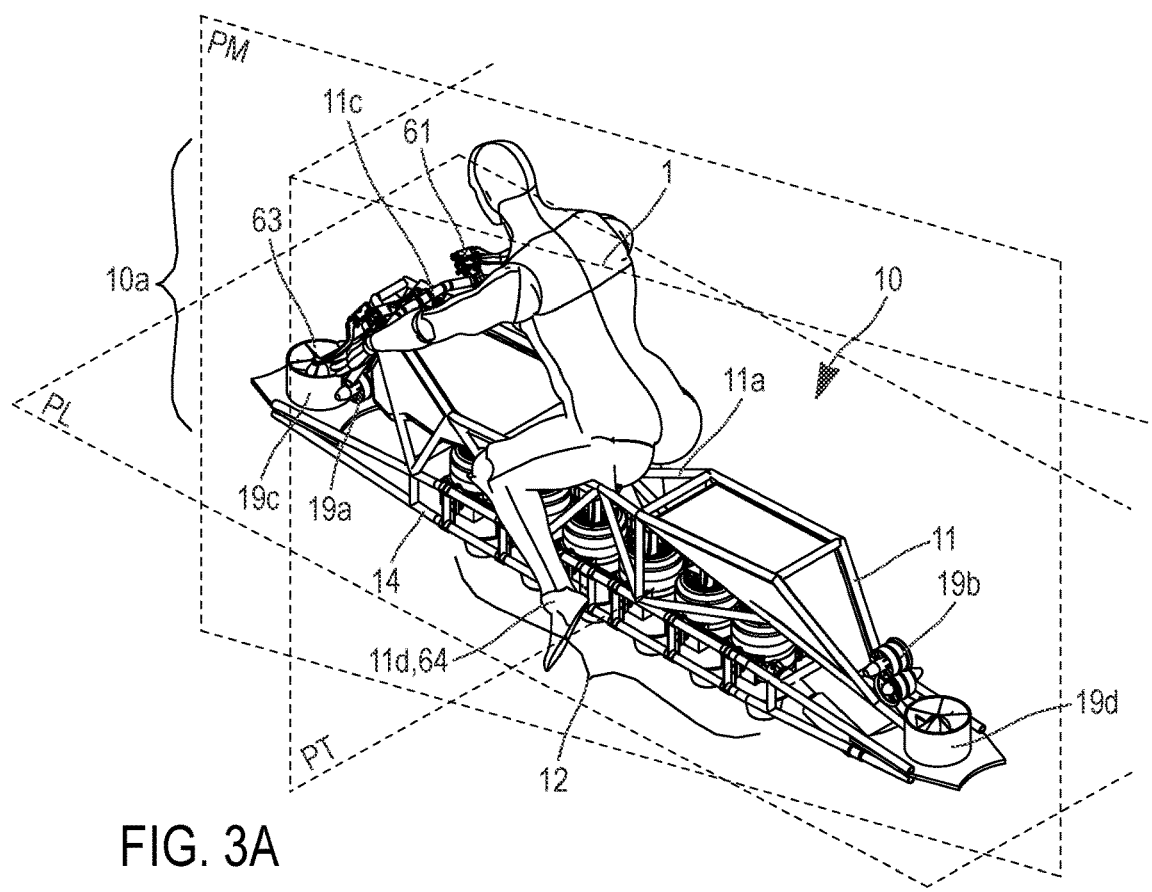
FIGS. 3A, 3B, 3C, 3D, 3E and 3F illustrate a second embodiment of a device for propelling a passenger according to the invention of which the dimensions of the platform are close to those of a frame of a terrestrial motorcycle.
Figure 4:
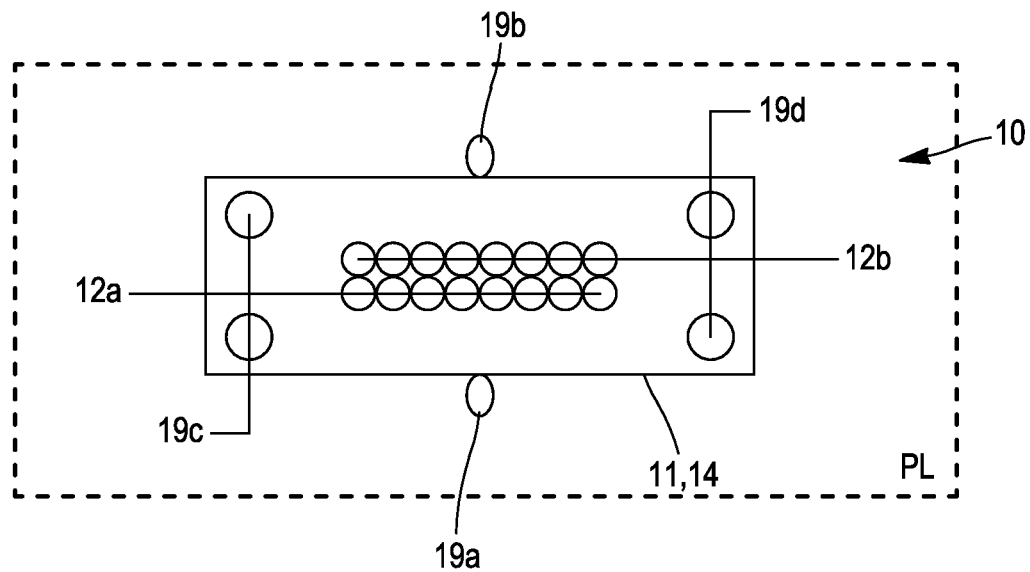
FIG. 4 shows a very simplified diagram of the configuration of a thrust unit of a third embodiment of a propulsion device according to the invention of which the configuration of the platform is substantially close to that of a frame of a terrestrial motor vehicle.

Such planes PM, PT, PL are shown by dashed lines in FIG. 3A. In the same way, we refer to a:
"transverse axis" as any axis belonging both to a transverse plane and a longitudinal plane;
"longitudinal axis" as any axis belonging both to a median plane and a longitudinal plane;
"median axis" as any axis belonging both to a median plane and a transverse plane.

FIGS. 3A to 3F allow us to describe the arrangement of a thrust unit 12 of a preferred example of a flying motorcycle. Such a thrust unit 12 comprises a thrust sub-unit 12a comprising six thrusters 12a1 to 12a6 according to this non-limitative example. Said thrusters 12a1 to 12a6 are positioned and held by support means 14, arranged so that said thrusters are aligned along a longitudinal axis AL10 of the body 10a of the device 10, the longitudinal axes of said thrusters, such as axis AL12a of the thruster 12a1, being substantially combined with a median plane PM of the body 10a of the device 10, said median plane passing through the center of gravity CG10 thereof. The respective ejection nozzles of said thrusters 12a1 to 12a6 are all parallel to one another. Thus the direction of gaseous flow ejection through each ejection nozzle of each thruster 12a1 to 12a6 is substantially opposite to the direction of an oriented longitudinal axis AL1 of the torso towards the head of the passenger 1.

Figures 3B, 3C:
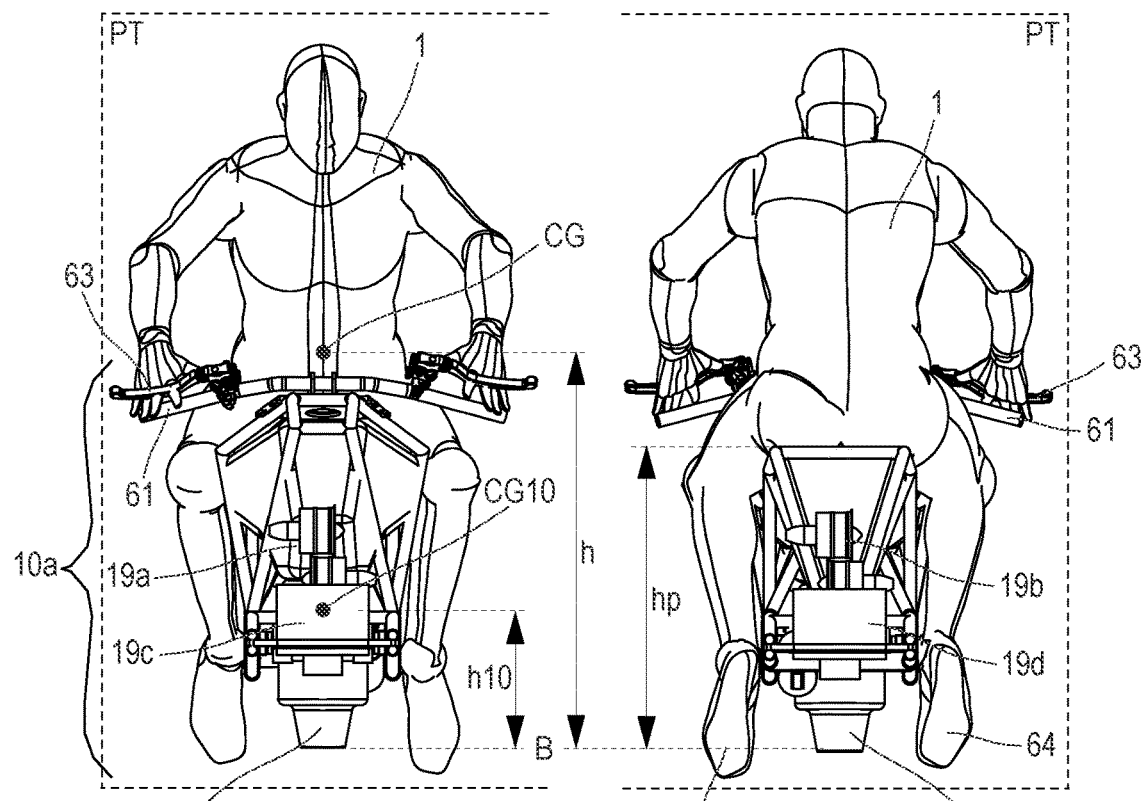
Figure 3D:
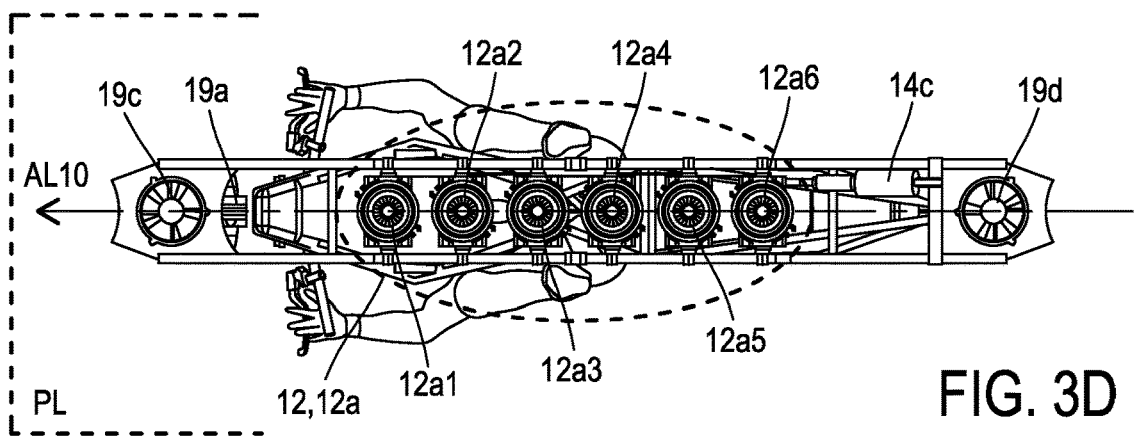
Figure 3E:
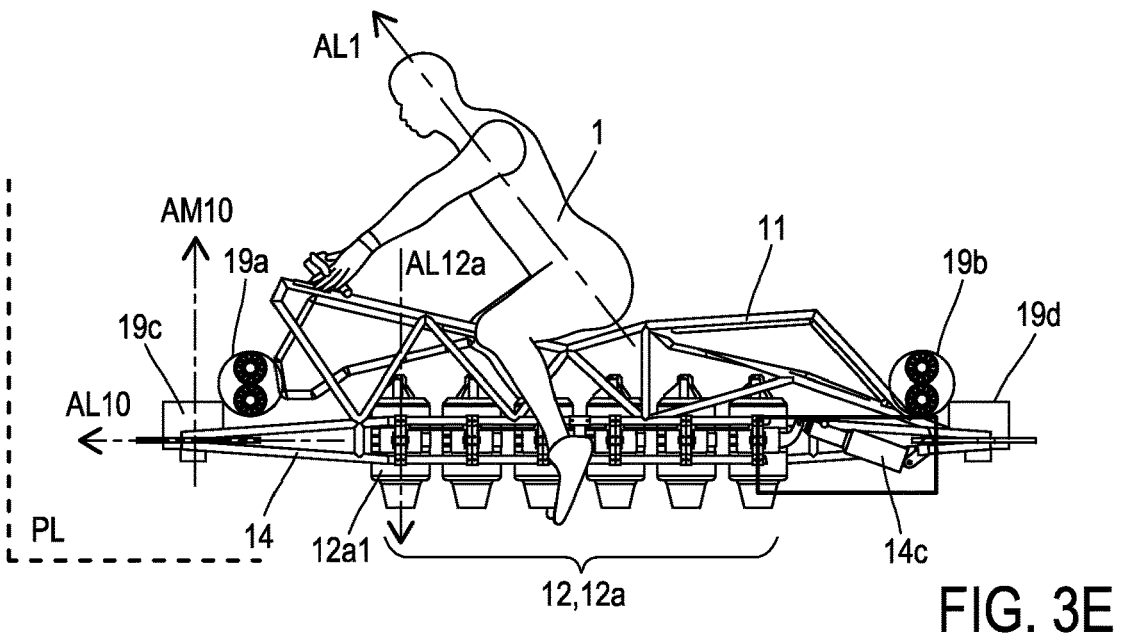
Figure 3F:
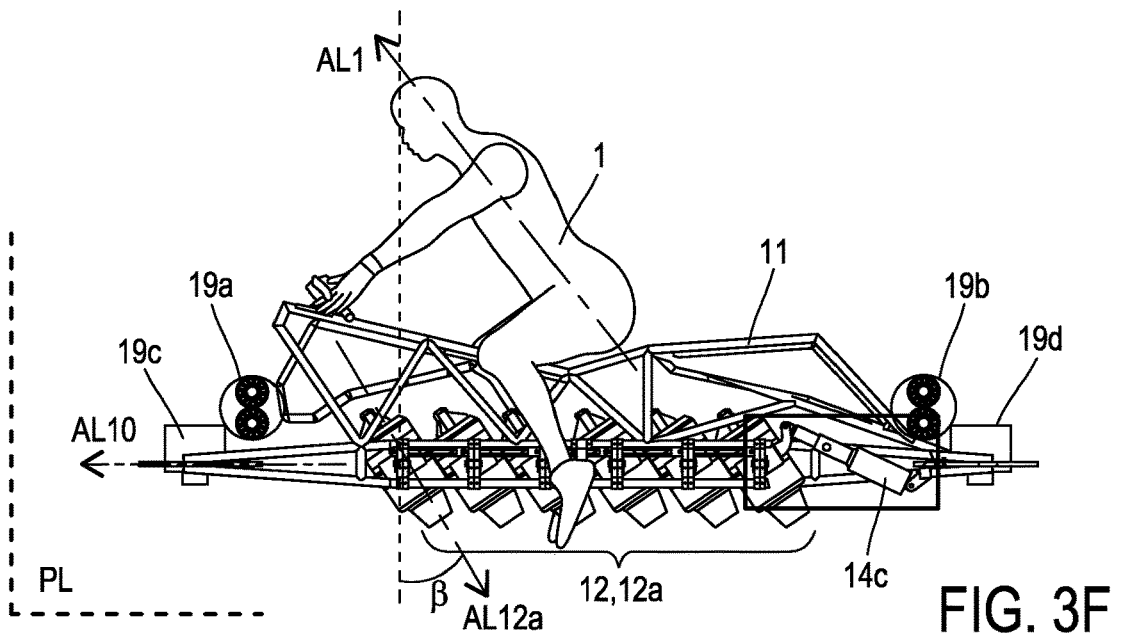

In relation to FIGS. 3E and 3F, we can observe that the support means 14 of the thrusters 12a1 to 12a6 allow said thrusters to be inclined by an angle β of between −45° and 45°, or at least to incline by said angle β the axis AL12 of the respective gaseous fluid ejection outlets, in a median plane PM of the body 10a of the device 10, in relation to a nominal fluid ejection direction, shown in FIG. 3E, i.e. substantially normal to a longitudinal axis AL10 of the body 10a of the device 10. Thus, according to FIG. 3E, the thrusters of the thrust unit 12 propel the device 10 along a vertical trajectory. By contrast, said thrusters create a forward movement of said device 10 when said fluid ejection directions are oriented according to FIG. 3F. The fluid ejection directions of the thrusters of the same thrust sub-unit 12a can thus be oriented under the impulse of an actuator 14c such as, by way of non-limiting example, a jack, the travel of which causes the combined inclination of said gaseous fluid outlets. Such an actuator 14c can advantageously be operated by commands controlled by the above-mentioned processing means present on the body 10a of the device 10, based on control instructions emanating from the passenger 1. By way of example, said actuator 14c can be at rest, as shown in FIG. 3E, when the sensors 63 and/or 64 are worked by the passenger 1 thus delivering deceleration instructions. Conversely, said actuator 14c can be implemented and cause the inclination of the thrusters of the thrust unit 12, under the action of a suitable command generated by said processing means, when said passenger releases the pressure exerted on the sensor 64 or the travel of the handle 63, while activating the rotating grip 61 translating the wish of the passenger 1 to increase the power of the thrust unit 12. Said inclination thus becomes progressive and more and more marked as the power of the thrust unit increases, and vice versa. A deceleration instruction combined with an instruction to increase the power of the thrust unit 12 can be synonymous with a vertical movement of the body 10a.

Like the device 10 described specifically in relation to FIG. 2C, the body 10a of the device 10 according to FIGS. 3B and 3C is advantageously arranged so that the area 11a of the platform 11, on which the passenger 1 takes up position, has a height hp relative to the low point B of the body 10a of the device 10, when the ejection nozzles (or fluid outlets) of the thrusters of the thrust sub-unit 12a are oriented towards the ground:
substantially equal to or greater than the height h10 relative to said low point B of the center of gravity CG10 of the body 10a of the device 10, and
less than the height h relative to said low point B of the center of gravity CG of the assembly including the device 10 and the passenger 1.

Thus, the height of the saddle 11a of said passenger 1 can advantageously be adjusted for height, depending on the weight or morphology of said passenger, and also depending on the feel or behavior of the device 10 desired by said passenger 1, so as to provide any passenger 1 with a propulsion device with great handling.

In order to be able specifically to pivot easily and move through curves, the thrust unit 12 of such a device 10 can advantageously include course-correction secondary thrusters 19a and 19b. These can be supported by the support means 14 and arranged eccentrically along a transverse axis of the platform 11, like the course-correction secondary thrusters of the device 10 previously described in relation to FIG. 2A. As a variation, in order to limit any inconvenience caused by the presence of such course-correction secondary thrusters in an eccentric position, the invention envisages that said course-correction secondary thrusters can consist in two pairs 19a and 19b of thrusters arranged to eject a fluid in opposite directions along axes that are substantially parallel to a transverse axis of the body 10a. Said two pairs 19a and 19b are held by the support means 14 in two positions respectively in front of and behind the area 11a of the platform provided to accommodate the passenger 1. Advantageously, in such a way as to increase their performance, these two pairs 19a and 19b will be respectively located near the ends of the body 10a. The prime function of said course-correction secondary thrusters involves maintaining the current course of the device 10 in the absence of any desire of the passenger to perform a curved trajectory. For this, said secondary thrusters of each pair 19a and 19b can be operated by an electric power command generated by the processing means previously mentioned, taking into account the information delivered by the attitude and trajectory sensor(s) present on the body 10a, in the absence of any instruction emanating from the passenger 1 indicating a desired change of trajectory. By being activated in a non-simultaneous way, these thrusters create a sufficient torque to cause a rotation about a median axis of the body 10a. Thus, when the thruster of the pair 19a located at the front of the body 10a, the ejection nozzle of which discharges a fluid towards the left of said body 10a, is activated together with the thruster of the pair 19b located at the back of the body 10a, the ejection nozzle of which discharges a fluid towards the right of said body 10a, the latter automatically orients itself to its right and vice versa. By way of example, when a gust of wind with a tendency to draw the propulsion device 10 along a yaw trajectory to the left or right of the passenger 1, said processing means, present on the body 10a, generate a power command for the course-correction secondary thrusters 19a and 19b, activating one of the secondary thrusters of each pair, said thrusters being oriented in opposite fluid ejection directions in order to cancel out this unexpected change of trajectory. Said course-correction secondary thrusters cut out as soon as the nominal trajectory is re-established. In this way, the propulsion device 10 automatically maintains its current trajectory and relieves said passenger 1 of any effort of compensation. As a variation or in addition, in order to do away with the use of such secondary thrusters, the invention envisages being able to add to all or some of the thrusters of the thrust sub-unit(s) 12a, 12b an orientable fluid outlet, of a cone type for orienting a fluid outlet of a jet ski for example, that would cooperate with the gaseous flow ejection nozzle of the thruster(s) concerned, by means of one or more respective mechanical connections, such as for example pivoting or embedded connections.

The choice of favoring course-correction secondary thrusters in the form of electric turbines can be justified by the high responsiveness required for such course-correction secondary thrusters 19a and 19b, so that they automatically and instantaneously compensate for meteorological disturbances, without the passenger's knowledge. However, as mentioned in connection with the previous embodiment, thermal thrusters, possibly provided with orientable fluid outlets, could be used instead of electric turbines.

Said course-correction secondary thrusters 19a and 19b also allow the passenger 1 to describe curved trajectories or lateral movements, for example to the left or right of the body 10a. Thus, when the passenger uses a rotatably mounted handlebar 11c, the processing means, responsible for generating the power commands of said secondary thrusters, use the information delivered by the sensor measuring the angle described by said handlebar in order to process power commands intended for one of the thrusters of each pair 19a and 19b, to create a curved trajectory. At a high speed of movement, such an instruction to change course desired by the passenger 1 will be generated by said processing means on the basis of information delivered by an inclinometer or gyroscope present on the body 10a of the device. Thus, when said passenger orients his body laterally and voluntarily to incline the body 10a of the device 10 to his right, an instruction to change course to the right of the passenger 1 will be generated by said processing means. The latter will generate the power commands of the course-correction secondary thrusters accordingly, as previously mentioned following the activation of the handlebar 11c. The same would apply for a voluntary inclination of the body 10a imposed by the passenger 1, thus converting his desire to change the current course to his left. The presence of said course-correction secondary thrusters 19a and 19b, associated with taking into account information delivered by multiple sensors converting the movement of the body 10a and/or the instructions for operation emanating from the passenger 1, thus also confers excellent handling to the propulsion device 10. According to an advantageous embodiment, the function of said course-correction secondary thrusters 19a and 19b can be reinforced by the presence of a fin or a jibe, in the form for example of a substantially flat optional element, oriented along a plane parallel to a median plane of the body 10a and orientable, via a pivoting type connection with an axis parallel to a median axis of the body 10a. Like a jibe used in aeronautics, such an optional element, not shown in the Figures in the interest of simplicity, can advantageously be controlled by an actuator with electrical commands. Such electrical commands can be generated by the electronic processing means present on the body 10a of the device 10 together with those intended for the thrusters 19a and 19b.

The platform 11 of such a device 10 being extended along a longitudinal axis of the body 10a, as well as the sitting position of the passenger 1, mean that it is not easy for said passenger 1 to control a substantially horizontal attitude along said longitudinal axis AL10. In order automatically to correct this horizontality of the attitude, such a propulsion device 10 can also include attitude-correction secondary thrusters 19c and 19d. These advantageously but not in a limiting way are in the form of electric turbines. They are located respectively at the ends of the body 10a of the device 10 and retained by the support means 14. They are oriented in the same direction parallel to a median axis AM10 of the body 10a of the device 10. They make it possible, like the course-correction secondary thrusters 19a and 19b, to maintain a substantially horizontal attitude along a longitudinal axis AL10 of the body 10a in the absence of any control instruction, aimed at getting said body 10a to dip or by contrast to get said body 10a to "rear." For this, said thrusters 19c and 19d are alternately activated via power commands generated by the processing means present on the body of the device 10, interpreting the information delivered by the attitude and/or trajectory sensors of said body 10a. Thus, when the device 10 is inadvertently thrown off balance by a gust of wind, the front thereof being higher than the back of the body 10a, the thruster 19d located at the back of said body 10a is activated to automatically correct the horizontality of the attitude, thus relieving the passenger 1 of any tiresome compensation of said attitude. By contrast, the attitude of said body 10a can be voluntarily changed by the passenger 1, by means of previously mentioned control instructions taken into account by said processing means present on the body 10a of the device 10. The passenger 1 can thus change at will all of the directions of movement of his propulsion device in an extremely intuitive manner like a rider of a terrestrial motorcycle.

The invention provides, as an option that can be deactivated, the automatic use of course-correction secondary thrusters 19a, 19b and/or attitude-correction secondary thrusters 19c, 19d, i.e. the option that makes it possible, merely by using the attitude and/or trajectory sensors present on the body 10a, to maintain a course or an attitude independently of control instructions emanating from the passenger's wish. Such a deactivation and/or such a reactivation can be determined by the passenger by means of an appropriate man/machine interface, for example a button present on the handlebar 11c, the electronic processing means of the body 10a taking into consideration the information delivered by such a man/machine interface in order to generate and transmit such commands to maintain course and/or attitude solely to the secondary thrusters if and only if said interface represents the passenger's wish to benefit from such assistance. If he does not wish to do so, the driver and/or passenger 1 will be able to avail himself solely of his full powers of orientation of the device 10 in order to perform certain maneuvers for which he desires no assistance. Such a functionality can be generalized for the entire device 10 according to the invention.

The description of the body 10a of such a device 10 by FIGS. 3A to 3F intentionally focuses on the essential elements of the operation of said device. However, just like the device 10 previously shown specifically in FIG. 2A, the body 10a of this second example of a propulsion device 10 according to the invention can advantageously comprise projecting means, not shown in FIGS. 3A to 3F, cooperating with the platform 11 and/or the support means 14 arranged to prevent any shock or direct contact between the ground and the thrust unit 12 of the device 10. Such projecting means can specifically consist in feet of sufficient length so that the ejection nozzle(s) of the thrust unit 12 cannot hit the ground and also so as to offer a certain stability, when the device 10 is placed on the ground or on a takeoff station, also not illustrated in said FIGS. 3A to 3F, so that the passenger 1 can efficiently take up position on the platform 11. As a variation, such projecting means could consist in a pair of skis or any other elements capable of ensuring a certain stability depending on the nature of the ground or support of the device 10. Advantageously, such projecting means can be collapsible or retractable, for example telescopic. The electronic processing means of the body 10a can be arranged to control respectively an automatic retraction and/or a deployment of said projecting means as soon as the speed of movement of the body 10a exceeds or falls below a predetermined speed, for example fifty kilometers per hour, and thus improve the aerodynamics. As a variation, such retraction and/or deployment could be triggered by the activation, by the passenger 1, of a set man/machine interface, such as a button or handle in communication with said processing means of the body 10a or directly with an actuator of said projecting means.

The body 10a may also comprise fairing elements, not shown in FIGS. 3A to 3F, cooperating with the platform 11 and/or the support means 14 by any mechanical embedded connection of a type that is reversible or irreversible (welding, screwing, for example) or constituting with said platform 11 one and the same physical entity. The function of such a fairing is to prevent any direct contact between the thrust unit 12 and the passenger 1. The morphology (dimensions, shape) of such a fairing will thus be chosen to match the dimensions of the thrust unit 12, to confer an aesthetic appearance and/or safeguard the aerodynamics of the body 10a of the propulsion device 10a, while limiting any inconvenience for the passenger 1. Indeed, it is advantageous to be able to limit any contact between the passenger and the thrust unit in order to prevent any risk of injury, since the temperature of the external walls of the thrust unit 12 can rapidly become very high. Furthermore, such a fairing can comprise one or more air inlets to supply the thrusters with fluid. Such air inlets could be provided with gratings to prevent the aspiration of foreign bodies (leaves, debris, birds, etc.). The choice of the material(s) provided to make such a fairing will depend on the maximum temperature of the thrust unit 12 within the immediate vicinity of the elements of said fairing, in order to prevent any damage to the structure thereof.

Lastly, in order to supply the thermal thrusters of the body 10a of such a device 10, said body 10a can comprise one or more recesses arranged to contain one or more tanks of the liquid or gaseous fuel required for the operation of said thrusters, for example kerosene. Such tanks are not shown in FIGS. 3A to 3F in the interest of simplicity. In order to prevent any imbalance that cannot automatically be compensated for by the course-correction secondary thrusters 19a and 19b, the tank(s) will advantageously be positioned as close as possible to the transverse plane PT passing through the center of gravity CG10 of the body 10a, and along a longitudinal axis belonging to a median plane PM passing through said center of gravity CG10. Also, in the interest of simplicity, the Figures do not show the fluid connection, comprising for example a series of hoses, collectors and/or service lines, between said fuel tank(s) and the thrusters of the body 10a in order to convey said fuel to said thrusters. Like the first embodiment previously described in relation to FIG. 2A, the invention envisages that it is possible to associate with the passenger 1 a supplementary fuel tank that can, if necessary, also be in fluid communication with said thrusters. Furthermore, the body 10a, as well as the clothes and/or accessories worn by the passenger 1, could include one or more electrical energy sources, for example one or more batteries, photovoltaic panels or wind generators, etc., connected to the organs requiring such an electrical supply, such as for example the processing means, sensors and electric turbines.

FIG. 4 briefly outlines a simplified top view of a vehicle 10 according to the invention, generalizing, to some extent, the exploitation of the invention to any flying vehicle equivalent to a motor vehicle, a transporter of goods, freight and/or terrestrial passengers.

As said FIG. 4 shows, the body of such a device, specifically a platform 11 and support means 14, can cooperate with, or include, a thrust unit comprising one or more thrust sub-units, in this case two thrust sub-units 12a and 12b of eight thermal thrusters each. The number of sub-units as well as the respective numbers of said thrust sub-units will be determined on the basis of the configuration of the body of the propulsion device, the load to be carried and the desired performance levels and range.

In order to ensure that such a vehicle offers excellent handling, it is advantageous to arrange said thrust unit so as to minimize the distance between the direction of gaseous flow ejection through the ejection nozzle of each thruster and the orthogonal projection of said direction of gaseous flow ejection in a median plane passing through the center of gravity of the vehicle's body.

Moreover, in order to do away with any compensation for unexpected loss of course, such a vehicle advantageously comprises course-correction secondary thrusters 19a and 19b. In relation to FIG. 4, such secondary thrusters are positioned laterally like those shown in relation to FIG. 2A. They could, as a variation or additionally, be arranged like the course-correction thrusters described in relation to FIG. 3A. Lastly, in order to maintain or change the horizontality of the attitude of such a vehicle along a longitudinal axis, said vehicle could comprise attitude-correction thrusters 19c and 19d substantially arranged at either end of the body of said vehicle. Depending on the width thereof, only two thrusters could be used, like those described in relation to FIG. 3A, or even two pairs, or two other assemblies of thrusters, in order to improve the stability of the vehicle. In this case, the vehicle described in relation to FIG. 4 has two pairs of attitude-correction thrusters 19c and 19d located in the corners of the body of said vehicle. Any type of man/machine interface for processing operating instructions could moreover be used. Such a vehicle can include electronic means for processing such instructions in order to generate the power commands of the various thrusters and attitude and/or trajectory sensors, of which the information produced by the latter are taken into account together with the control instructions from said processing means in order to produce the power commands.

Whatever the configuration of the body of such a propulsion device according to the invention, said device enables a large number of entertainment applications and/or services. The invention revolutionizes transport as it is currently known and cannot be limited merely to the examples of use previously mentioned.

Accessories to further improve the entertainment features or conditions of use of such a device could also be provided, specifically as regards lighting, navigational aids, remote operation with or without a passenger, etc. By way of example, such a device could include long-range communication means to interact with a remote operating station, so that said station could generate control instructions that can be interpreted by electronic processing means of the device 10 in a suppletive manner. As a variation, said electronic processing means could memorize movement coordinates, provided before a flight or during such a flight by the passenger, in order to produce the power commands delivered to the different thrusters of the device 10 and reach a destination without assistance from said passenger. Said electronic processing means could make use of the possible presence of a GPS receiver, as previously mentioned, to know at any moment the geographical position of the device 10 during its journey.

The invention also envisages the presence of any man/machine interface adapted to display to the passenger, graphically, acoustically or kinesthetically, information relating to the operation of his propulsion device. A system for viewing said information incorporated into a visor of a crash helmet and/or for detecting operating instructions by analyzing the movements of the iris of one of the eyes of the passenger wearing such a helmet could, for example, be envisaged.

As shown in FIG. 2F in relation to the non-limiting example of a thrust unit 12 according to FIG. 2E, the invention also envisages being able to add to all or some of the thrusters of the thrust sub-unit(s) 12a, 12b an orientable fluid outlet of a cone type for orienting a fluid outlet of a jet ski for example, that would cooperate with the gaseous flow ejection nozzle of the thruster(s) concerned. This applies to FIG. 2F, which shows two views, front and side respectively, of an example of a thrust unit 12 comprising two thrust sub-units 12a and 12b. Among the four thrusters, FIG. 2F features thruster 12b1, the nominal direction AL12b of gaseous flow ejection of which is shown by a dashed line. We can see that the gaseous flow ejection nozzle of said thruster 12b1 cooperates with a movably mounted fluid outlet 12ex, such as an orientable cone, by means of a pivoting mechanical connection with an axis 12ax parallel to a transverse axis of the body 10a of a device 10 described in relation to FIG. 2A. Such an orientable fluid outlet can describe, in a median plane of the body 10a, an angle δ about the axis 12ax. Thus, whether a thruster of a thrust unit according to the invention is dynamically oriented or not, the processing means of the body of a propulsion device can be adapted to control an actuator of such an orientable fluid outlet in order to divert the fluid ejection direction of said thruster specifically by rotation about an axis parallel to a transverse axis of the body of the device. In this way, it becomes possible, without having to incline the thruster and/or said body of the propulsion device as such, to favor a forward movement of said device when such a fluid outlet is oriented towards the back thereof and vice versa. Such a function can be activated on demand by the passenger, for example by working an appropriate man/machine interface, like the device, known by the name of TRIM, fitted to numerous outboard motors of boats, consisting in a jack positioned on the retaining bracket of the motor and controlled by a button or a trigger by the passenger of said boat. The effect of the TRIM is to move the motor away from or towards the boat's transom, so as to change the thrust angle of the motorized propeller and, consequently, the attitude of said boat. Such an adaptation of the fluid outlets of the thrusters of a propulsion device according to the invention, provided that it complies with the first, second or third embodiments, i.e. those described by way of example in FIG. 2A, 3A or 4, favors the rectilinear movements, as well as the speed of movement, of the propulsion device while maintaining a horizontality of the attitude of the body thereof.

The invention claimed is:

1. Propulsion device comprising: a body including a platform and a thrust unit, said platform defining a longitudinal direction, said thrust unit comprising a first thermal thruster configured to eject a gaseous flow along a first axis in a thrust direction normal to the longitudinal direction, and a first electrical secondary thruster configured to eject a gaseous flow along a second axis in the thrust direction and a second electrical secondary thruster configured to eject a gaseous flow along a third axis in the thrust direction in order to correct an attitude of the propulsion device, a longitudinal axis of the propulsion device extending in the longitudinal direction and passing through said first axis, said second axis and said third axis, said body of the propulsion device comprising support means of the thrust unit, wherein said support means are arranged such that a shortest distance between the second axis and the third axis is greater than a shortest distance between the first axis and the second axis and is greater than a shortest distance between the first axis and the third axis.

2. The propulsion device according to claim 1, wherein power commands of the first electrical secondary thruster are generated based on the attitude of the propulsion device.

3. The propulsion device according to claim 1, wherein the first electrical secondary thruster is located proximate one end of the body of the propulsion device.

4. The propulsion device according to claim 1, wherein the thrust unit comprises: —a second thermal thruster configures configured to eject a gaseous flow along a fourth axis in the thrust direction; and the thermal thrusters and the electrical secondary thrusters being mutually arranged so that the first, second, third and fourth axes are all disposed entirely in a single plane.

5. The propulsion device according to claim 4, wherein the center of gravity of the body of the propulsion device is disposed in the single plane.

6. The propulsion device according to claim 5, wherein the first and second thermal thrusters are arranged between said first and second electrical secondary thrusters.

7. The propulsion device according to claim 1, wherein the platform is arranged to accommodate a passenger.

\* \* \* \* \*